United States Patent
Kilic et al.

(10) Patent No.: US 12,553,383 B1
(45) Date of Patent: Feb. 17, 2026

(54) HEAT EXCHANGERS FOR GAS TURBINE ENGINES

(71) Applicant: General Electric Company, Evendale, OH (US)

(72) Inventors: Mehmet Kilic, Kocaeli (TR); Michael Vadnais, Delafield, WI (US); Hojjat Nasr, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/225,279

(22) Filed: Jun. 2, 2025

(51) Int. Cl.
*F02C 7/18* (2006.01)

(52) U.S. Cl.
CPC .......... *F02C 7/18* (2013.01); *F05D 2260/213* (2013.01)

(58) Field of Classification Search
CPC .......... F01D 25/08; F01D 25/12; F01D 25/14; F01D 25/24; F02C 7/18; F28D 1/0233; F05D 2260/213
See application file for complete search history.

(56) References Cited

U.S. PATENT DOCUMENTS

| | | | | |
|---|---|---|---|---|
| 4,527,622 | A * | 7/1985 | Weber | F28F 3/025 165/166 |
| 6,102,111 | A * | 8/2000 | Kamio | F28F 9/001 165/DIG. 399 |
| 6,244,333 | B1 * | 6/2001 | Bergh | F28D 9/0025 165/157 |
| 9,372,018 | B2 | 6/2016 | Barone et al. | |
| 9,448,010 | B2 | 9/2016 | Van Lieu | |
| 9,472,489 | B2 * | 10/2016 | Nakamura | H01L 23/40 |
| 10,458,715 | B2 | 10/2019 | Diffey | |
| 10,670,349 | B2 | 6/2020 | Wilson et al. | |
| 10,739,086 | B2 | 8/2020 | Aouizerate et al. | |
| 11,262,144 | B2 | 3/2022 | Breeze-Stringfellow et al. | |
| 11,274,882 | B2 | 3/2022 | Diffey | |
| 11,549,393 | B2 | 1/2023 | Cleyet et al. | |
| 2009/0159246 | A1 | 6/2009 | Cornet et al. | |
| 2010/0108042 | A1 * | 5/2010 | Akiyoshi | F28F 3/025 29/890.03 |
| 2010/0181058 | A1 * | 7/2010 | Huazhao | F28D 1/05383 165/173 |
| 2011/0240270 | A1 * | 10/2011 | Hisanaga | F28D 7/1684 165/151 |
| 2014/0352933 | A1 | 12/2014 | Stephens et al. | |
| 2016/0123230 | A1 * | 5/2016 | Thomas | F02K 3/115 60/39.83 |
| 2018/0120032 | A1 * | 5/2018 | Anderson | F02K 3/105 |

FOREIGN PATENT DOCUMENTS

FR 3028019 A1 5/2016

* cited by examiner

*Primary Examiner* — Courtney D Heinle
*Assistant Examiner* — Cameron A Corday
(74) *Attorney, Agent, or Firm* — Hanley, Flight & Zimmerman, LLC

(57) ABSTRACT

Heat exchangers for gas turbine engines are described herein. An example heat exchanger includes a first plenum, a second plenum, and divider plates coupled to and extending between the first and second plenums. The divider plates are spaced apart from each other. Each of the divider plates has one or more internal passages for a fluid to flow between the first and second plenums. The heat exchanger also includes stiffeners between each adjacent pair of the divider plates, wherein at least one of the stiffeners is skewed relative to a connecting one of the divider plates.

20 Claims, 18 Drawing Sheets

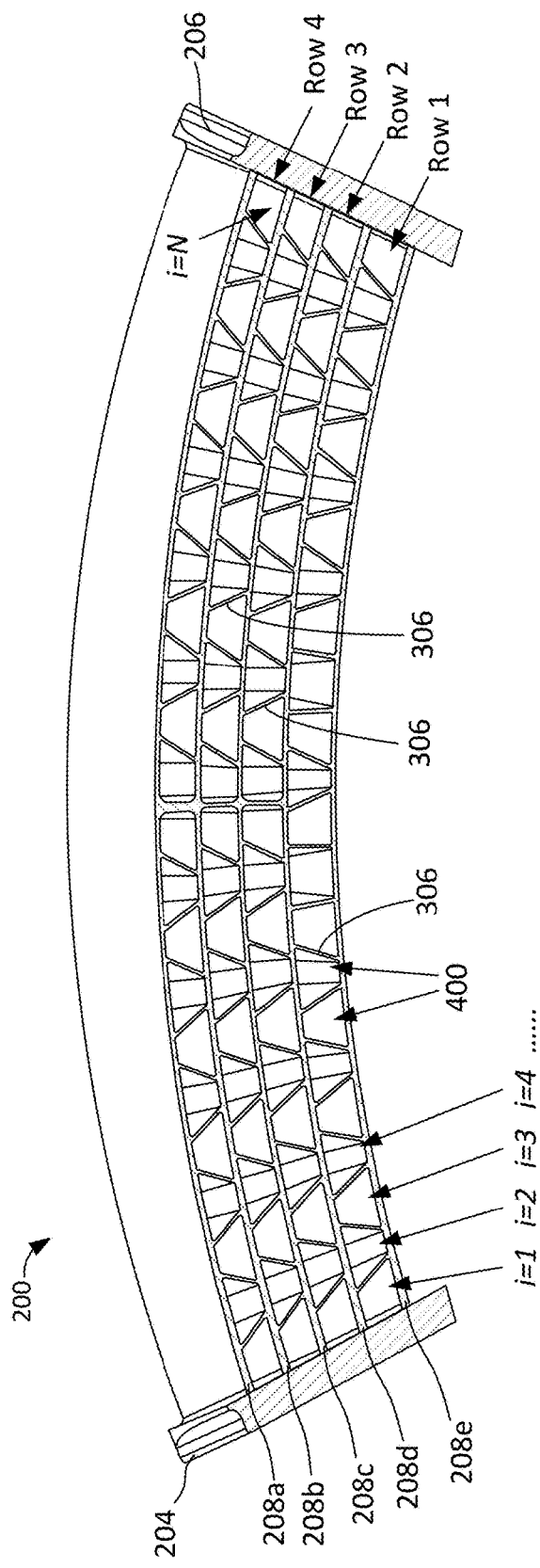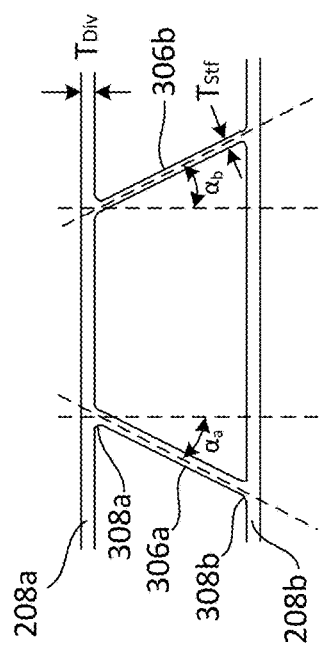
FIG. 4
FIG. 5

| | Passage | Example 1 L1(mm) | L2(mm) | Example 2 L1(mm) | L2(mm) | Example 3 L1(mm) | L2(mm) | Example 4 L1(mm) | L2(mm) | Example 5 L1(mm) | L2(mm) | Example 6 L1(mm) | L2(mm) | Example 7 L1(mm) | L2(mm) |
|---|---|---|---|---|---|---|---|---|---|---|---|---|---|---|---|
| Row 1 | 1,9 | 10.8 | 10.1 | 9.6 | 11.3 | 8.6 | 12.2 | 5.3 | 15.3 | 4.2 | 16.4 | 1.9 | 18.4 | 1.7 | 18.6 |
| | 2,4,6,8 | 20.2 | 21.6 | 17.9 | 24.1 | 16.1 | 26.1 | 9.9 | 32.8 | 7.8 | 35.0 | 3.6 | 39.4 | 3.2 | 39.8 |
| | 3,5,7 | 21.6 | 20.2 | 19.2 | 22.5 | 17.2 | 24.4 | 10.5 | 30.6 | 8.3 | 32.7 | 3.9 | 36.9 | 3.5 | 37.3 |
| | 10,14 | 25.3 | 26.7 | 25.3 | 26.7 | 25.3 | 26.7 | 25.3 | 26.7 | 25.3 | 26.7 | 25.3 | 26.7 | 25.3 | 26.7 |
| | 11,13 | 13.9 | 12.8 | 12.3 | 14.2 | 11.1 | 15.4 | 6.8 | 19.3 | 5.3 | 20.6 | 2.5 | 23.3 | 2.2 | 23.5 |
| | 12 | 25.5 | 27.8 | 22.6 | 31.0 | 20.3 | 33.5 | 12.4 | 42.1 | 9.8 | 45.0 | 4.6 | 50.7 | 4.1 | 51.2 |
| | 15,23 | 11.0 | 10.4 | 9.7 | 11.6 | 8.7 | 12.5 | 5.3 | 15.7 | 4.2 | 16.8 | 2.0 | 18.9 | 1.8 | 19.1 |
| Row 2 | 16,18,20,22 | 20.8 | 22.0 | 18.4 | 24.5 | 16.5 | 26.5 | 10.1 | 33.2 | 8.0 | 35.5 | 3.7 | 40.0 | 3.3 | 40.4 |
| | 17,19,21 | 22.0 | 20.8 | 19.5 | 23.1 | 17.5 | 25.0 | 10.7 | 31.4 | 8.4 | 33.5 | 3.9 | 37.8 | 3.5 | 38.2 |
| | 24,34 | 11.4 | 10.9 | 10.1 | 12.1 | 9.1 | 13.1 | 5.5 | 16.5 | 4.4 | 17.6 | 2.0 | 19.8 | 1.8 | 20.0 |
| | 25,27,29,31,33 | 21.8 | 22.8 | 19.3 | 25.4 | 17.3 | 27.5 | 10.6 | 34.5 | 8.4 | 36.8 | 3.9 | 41.5 | 3.5 | 42.0 |
| | 26,28,30,32 | 22.8 | 21.8 | 20.2 | 24.2 | 18.1 | 26.2 | 11.1 | 32.9 | 8.8 | 35.2 | 4.1 | 39.6 | 3.6 | 40.1 |
| | 35 | 10.8 | 11.3 | 9.6 | 12.6 | 8.6 | 13.6 | 5.3 | 17.1 | 4.1 | 18.3 | 1.9 | 20.6 | 1.7 | 20.8 |
| | 36,38,40,42,44 | 22.6 | 21.6 | 20.0 | 24.0 | 18.0 | 26.0 | 11.0 | 32.7 | 8.7 | 34.9 | 4.0 | 39.3 | 3.6 | 39.7 |
| | 37,39,41,43,45 | 21.6 | 22.6 | 19.1 | 25.2 | 17.2 | 27.2 | 10.5 | 34.2 | 8.3 | 36.5 | 3.8 | 41.2 | 3.4 | 41.6 |
| | 46 | 11.3 | 10.8 | 10.0 | 12.0 | 9.0 | 13.0 | 5.5 | 16.3 | 4.3 | 17.4 | 2.0 | 19.7 | 1.8 | 19.9 |
| Row 3 | 47,57 | 11.9 | 11.4 | 10.5 | 12.7 | 9.5 | 13.7 | 5.8 | 17.3 | 4.6 | 18.4 | 2.1 | 20.8 | 1.9 | 21.0 |
| | 48,50,52,54,56 | 22.8 | 23.8 | 20.2 | 26.5 | 18.1 | 28.7 | 11.1 | 36.0 | 8.8 | 38.4 | 4.1 | 43.3 | 3.6 | 43.8 |
| | 49,51,53,55 | 23.8 | 22.8 | 21.1 | 25.4 | 18.9 | 27.5 | 11.6 | 34.5 | 9.1 | 36.8 | 4.2 | 41.5 | 3.8 | 42.0 |
| | 58 | 11.3 | 11.8 | 10.0 | 13.1 | 9.0 | 14.2 | 5.5 | 17.8 | 4.3 | 19.0 | 2.0 | 21.5 | 1.8 | 21.7 |
| | 59,61,63,65,67 | 23.6 | 22.6 | 20.9 | 25.2 | 18.7 | 27.2 | 11.5 | 34.2 | 9.0 | 36.5 | 4.2 | 41.2 | 3.8 | 41.6 |
| | 60,62,64,66,68 | 22.6 | 23.6 | 20.0 | 26.2 | 18.0 | 28.4 | 11.0 | 35.6 | 8.7 | 38.1 | 4.0 | 42.9 | 3.6 | 43.4 |
| | 69 | 11.8 | 11.3 | 10.4 | 12.6 | 9.4 | 13.6 | 5.7 | 17.1 | 4.5 | 18.3 | 2.1 | 20.6 | 1.9 | 20.8 |
| Row 4 | 70,80 | 12.4 | 11.9 | 11.0 | 13.2 | 9.8 | 14.3 | 6.0 | 18.0 | 4.7 | 19.2 | 2.2 | 21.7 | 2.0 | 21.9 |
| | 71,73,75,77,79 | 23.8 | 24.7 | 21.1 | 27.5 | 18.9 | 29.8 | 11.6 | 37.4 | 9.1 | 40.0 | 4.2 | 45.0 | 3.8 | 45.5 |
| | 72,74,76,78 | 24.7 | 23.8 | 21.9 | 26.5 | 19.7 | 28.7 | 12.0 | 36.0 | 9.5 | 38.4 | 4.4 | 43.3 | 3.9 | 43.8 |
| | 81 | 11.8 | 12.2 | 10.4 | 13.6 | 9.4 | 14.7 | 5.7 | 18.5 | 4.5 | 19.8 | 2.1 | 22.3 | 1.9 | 22.5 |
| | 82,84,86,88,90 | 24.5 | 23.6 | 21.7 | 26.2 | 19.5 | 28.4 | 11.9 | 35.6 | 9.4 | 38.1 | 4.4 | 42.9 | 3.9 | 43.4 |
| | 83,85,87,89,91 | 23.6 | 24.5 | 20.9 | 27.3 | 18.7 | 29.5 | 11.5 | 37.0 | 9.0 | 39.6 | 4.2 | 44.6 | 3.8 | 45.0 |
| | 92 | 12.2 | 11.8 | 10.8 | 13.1 | 9.7 | 14.2 | 6.0 | 17.8 | 4.7 | 19.0 | 2.2 | 21.5 | 2.0 | 21.7 |

FIG. 8A

| | Passage | Example 1 L1(mm) | Example 1 L2(mm) | Example 2 L1(mm) | Example 2 L2(mm) | Example 3 L1(mm) | Example 3 L2(mm) | Example 4 L1(mm) | Example 4 L2(mm) | Example 5 L1(mm) | Example 5 L2(mm) | Example 6 L1(mm) | Example 6 L2(mm) | Example 7 L1(mm) | Example 7 L2(mm) |
|---|---|---|---|---|---|---|---|---|---|---|---|---|---|---|---|
| Row 1 | 1,9 | 10.8 | 10.1 | 9.6 | 11.3 | 8.6 | 12.2 | 5.3 | 15.3 | 4.2 | 16.4 | 1.9 | 18.4 | 1.7 | 18.6 |
| | 2,4,6,8 | 20.2 | 21.6 | 17.9 | 24.1 | 16.1 | 26.1 | 9.9 | 32.8 | 7.8 | 35.0 | 3.6 | 39.4 | 3.2 | 39.8 |
| | 3,5,7 | 21.6 | 20.2 | 19.2 | 22.5 | 17.2 | 24.4 | 10.5 | 30.6 | 8.3 | 32.7 | 3.9 | 36.9 | 3.5 | 37.3 |
| | 10,14 | 25.3 | 26.7 | 25.3 | 26.7 | 25.3 | 26.7 | 25.3 | 26.7 | 25.3 | 26.7 | 25.3 | 26.7 | 25.3 | 26.7 |
| | 11,13 | 13.9 | 12.8 | 12.3 | 14.2 | 11.1 | 15.4 | 6.8 | 19.3 | 5.3 | 20.6 | 2.5 | 23.3 | 2.2 | 23.5 |
| | 12 | 25.5 | 27.8 | 22.6 | 31.0 | 20.3 | 33.5 | 12.4 | 42.1 | 9.8 | 45.0 | 4.6 | 50.7 | 4.1 | 51.2 |
| | 15,23 | 11.0 | 10.4 | 9.7 | 11.6 | 8.7 | 12.5 | 5.3 | 15.7 | 4.2 | 16.8 | 2.0 | 18.9 | 1.8 | 19.1 |
| Row 2 | 16,18,20,22 | 20.8 | 22.0 | 18.4 | 24.5 | 16.5 | 26.5 | 10.1 | 33.2 | 8.0 | 35.5 | 3.7 | 40.0 | 3.3 | 40.4 |
| | 17,19,21 | 22.0 | 20.8 | 19.5 | 23.1 | 17.5 | 25.0 | 10.7 | 31.4 | 8.4 | 33.5 | 3.9 | 37.8 | 3.5 | 38.2 |
| | 24,34 | 11.4 | 10.9 | 10.1 | 12.1 | 9.1 | 13.1 | 5.5 | 16.5 | 4.4 | 17.6 | 2.0 | 19.8 | 1.8 | 20.0 |
| | 25,27,29,31,33 | 21.8 | 22.8 | 19.3 | 25.4 | 17.3 | 27.5 | 10.6 | 34.5 | 8.4 | 36.8 | 3.9 | 41.5 | 3.5 | 42.0 |
| | 26,28,30,32 | 22.8 | 21.8 | 20.2 | 24.2 | 18.1 | 26.2 | 11.1 | 32.9 | 8.8 | 35.2 | 4.1 | 39.6 | 3.6 | 40.1 |
| | 35 | 10.8 | 11.3 | 9.6 | 12.6 | 8.6 | 13.6 | 5.3 | 17.1 | 4.1 | 18.3 | 1.9 | 20.6 | 1.7 | 20.8 |
| | 36,38,40,42,44 | 22.6 | 21.6 | 20.0 | 24.0 | 18.0 | 26.0 | 11.0 | 32.7 | 8.7 | 34.9 | 4.0 | 39.3 | 3.6 | 39.7 |
| | 37,39,41,43,45 | 21.6 | 22.6 | 19.1 | 25.2 | 17.2 | 27.2 | 10.5 | 34.2 | 8.3 | 36.5 | 3.8 | 41.2 | 3.4 | 41.6 |
| | 46 | 11.3 | 10.8 | 10.0 | 12.0 | 9.0 | 13.0 | 5.5 | 16.3 | 4.3 | 17.4 | 2.0 | 19.7 | 1.8 | 19.9 |
| Row 3 | 47,57 | 11.9 | 11.4 | 10.5 | 12.7 | 9.5 | 13.7 | 5.8 | 17.3 | 4.6 | 18.4 | 2.1 | 20.8 | 1.9 | 21.0 |
| | 48,50,52,54,56 | 22.8 | 23.8 | 20.2 | 26.5 | 18.1 | 28.7 | 11.1 | 36.0 | 8.8 | 38.4 | 4.1 | 43.3 | 3.6 | 43.8 |
| | 49,51,53,55 | 23.8 | 22.8 | 21.1 | 25.4 | 18.9 | 27.5 | 11.6 | 34.5 | 9.1 | 36.8 | 4.2 | 41.5 | 3.8 | 42.0 |
| | 58 | 11.3 | 11.8 | 10.0 | 13.1 | 9.0 | 14.2 | 5.5 | 17.8 | 4.3 | 19.0 | 2.0 | 21.5 | 1.8 | 21.7 |
| | 59,61,63,65,67 | 23.6 | 22.6 | 20.9 | 25.2 | 18.7 | 27.2 | 11.5 | 34.2 | 9.0 | 36.5 | 4.2 | 41.2 | 3.8 | 41.6 |
| | 60,62,64,66,68 | 22.6 | 23.6 | 20.0 | 26.2 | 18.0 | 28.4 | 11.0 | 35.6 | 8.7 | 38.1 | 4.0 | 42.9 | 3.6 | 43.4 |
| | 69 | 11.8 | 11.3 | 10.4 | 12.6 | 9.4 | 13.6 | 5.7 | 17.1 | 4.5 | 18.3 | 2.1 | 20.6 | 1.9 | 20.8 |
| Row 4 | 70,80 | 12.4 | 11.9 | 11.0 | 13.2 | 9.8 | 14.3 | 6.0 | 18.0 | 4.7 | 19.2 | 2.2 | 21.7 | 2.0 | 21.9 |
| | 71,73,75,77,79 | 23.8 | 24.7 | 21.1 | 27.5 | 18.9 | 29.8 | 11.6 | 37.4 | 9.1 | 40.0 | 4.2 | 45.0 | 3.8 | 45.5 |
| | 72,74,76,78 | 24.7 | 23.8 | 21.9 | 26.5 | 19.7 | 28.7 | 12.0 | 36.0 | 9.5 | 38.4 | 4.4 | 43.3 | 3.9 | 43.8 |
| | 81 | 11.8 | 12.2 | 10.4 | 13.6 | 9.4 | 14.7 | 5.7 | 18.5 | 4.5 | 19.8 | 2.1 | 22.3 | 1.9 | 22.5 |
| | 82,84,86,88,90 | 24.5 | 23.6 | 21.7 | 26.2 | 19.5 | 28.4 | 11.9 | 35.6 | 9.4 | 38.1 | 4.4 | 42.9 | 3.9 | 43.4 |
| | 83,85,87,89,91 | 23.6 | 24.5 | 20.9 | 27.3 | 18.7 | 29.5 | 11.5 | 37.0 | 9.0 | 39.6 | 4.2 | 44.6 | 3.8 | 45.0 |
| | 92 | 12.2 | 11.8 | 10.8 | 13.1 | 9.7 | 14.2 | 6.0 | 17.8 | 4.7 | 19.0 | 2.2 | 21.5 | 2.0 | 21.7 |
| | | SSR=1.00 | | SSR=1.25 | | SSR=1.50 | | SSR=3.00 | | SSR=4.00 | | SSR=9.00 | | SSR=10.0 | |

FIG. 8B

| SSR | Offset Node 1st Bending Frequency | Frequency Ratio | 1st Panel Frequency | Common Node 1st Bending Frequency | Frequency Ratio |
|---|---|---|---|---|---|
| 1 | 581.0 | | | 581.0 | |
| 1.25 | 887.0 | 1.53 | | 656.5 | 1.13 |
| 1.5 | 1296.9 | 2.23 | | 805.2 | 1.39 |
| 2 | 1913.6 | 3.29 | | 1126.2 | 1.94 |
| 2.5 | 2342.2 | 4.03 | | 1417.6 | 2.44 |
| 3 | 2662.4 | 4.58 | | 1674.5 | 2.88 |
| 3.5 | 2912.3 | 5.01 | | 1900.9 | 3.27 |
| 4 | 3112.5 | 5.36 | | 2101.4 | 3.62 |
| 5 | 3410.4 | 5.87 | 4249.9 | 2437.3 | 4.20 |
| 6 | 3617.4 | 6.23 | 4138.1 | 2703.0 | 4.65 |
| 8 | 3880.7 | 6.68 | 4026.5 | 3095.1 | 5.33 |
| 9 | 3962.5 | 6.82 | 4001.1 | 3240.8 | 5.58 |
| 10 | 4041.0 | 6.96 | 3968.0 | 3362.0 | 5.79 |

FIG. 9

$N_{Div}$ = number of divider plates $N_{Stf}$ = number of stiffeners $T_{Div}$ = average thickness of the divider plates $T_{Stf}$ = average thickness of the stiffeners

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|---|---|---|---|---|
| $L_{S1}$ (mm) | 415.3 | 415.3 | 415.3 | 415.3 | 415.3 | 415.3 | 415.3 | 415.3 | 415.3 | 415.3 | 415.3 | 415.3 | 415.3 | 415.3 | 415.3 | 415.3 | 415.3 | 415.3 |
| $L_{S2}$ (mm) | 463.6 | 463.6 | 463.6 | 463.6 | 463.6 | 463.6 | 463.6 | 463.6 | 463.6 | 463.6 | 463.6 | 463.6 | 463.6 | 463.6 | 463.6 | 463.6 | 463.6 | 463.6 |
| $H_1$ (mm) | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 |
| $H_2$ (mm) | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 |
| $\overline{T_{Div}}$ (mm) | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 |
| $\overline{T_{Stf}}$ (mm) | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 |
| $N_{Div}$ | 3.0 | 3.0 | 3.0 | 3.0 | 3.0 | 3.0 | 3.0 | 3.0 | 3.0 | 5.0 | 5.0 | 5.0 | 5.0 | 5.0 | 5.0 | 5.0 | 5.0 | 5.0 |
| $N_{Stf}$ | 20.0 | 20.0 | 20.0 | 44.0 | 44.0 | 44.0 | 70.0 | 70.0 | 70.0 | 20.0 | 20.0 | 20.0 | 44.0 | 44.0 | 44.0 | 70.0 | 70.0 | 70.0 |
| SSR | 1.5 | 3 | 4 | 1.5 | 3 | 4 | 1.5 | 3 | 4 | 1.5 | 3 | 4 | 1.5 | 3 | 4 | 1.5 | 3 | 4 |

FIG. 13A

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|---|---|---|---|---|
| $L_{S1}$ (mm) | 437.9 | 437.9 | 437.9 | 437.9 | 437.9 | 437.9 | 437.9 | 437.9 | 437.9 | 437.9 | 437.9 | 437.9 | 437.9 | 437.9 | 437.9 | 437.9 | 437.9 | 437.9 |
| $L_{S2}$ (mm) | 511.0 | 511.0 | 511.0 | 511.0 | 511.0 | 511.0 | 511.0 | 511.0 | 511.0 | 511.0 | 511.0 | 511.0 | 511.0 | 511.0 | 511.0 | 511.0 | 511.0 | 511.0 |
| $H_1$ (mm) | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 |
| $H_2$ (mm) | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 |
| $\overline{T}_{Div}$ (mm) | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 |
| $\overline{T}_{Stf}$ (mm) | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 |
| $N_{Div}$ | 3 | 3 | 3 | 3 | 3 | 3 | 3 | 3 | 3 | 5 | 5 | 5 | 5 | 5 | 5 | 5 | 5 | 5 |
| $N_{Stf}$ | 20 | 20 | 20 | 44 | 44 | 44 | 70 | 70 | 70 | 20 | 20 | 20 | 44 | 44 | 44 | 70 | 70 | 70 |
| SSR | 1.5 | 3 | 4 | 1.5 | 3 | 4 | 1.5 | 3 | 4 | 1.5 | 3 | 4 | 1.5 | 3 | 4 | 1.5 | 3 | 4 |

FIG. 13B

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|---|---|---|---|---|
| $L_{S1}$ (mm) | 489.5 | 489.5 | 489.5 | 489.5 | 489.5 | 489.5 | 489.5 | 489.5 | 489.5 | 489.5 | 489.5 | 489.5 | 489.5 | 489.5 | 489.5 | 489.5 | 489.5 | 489.5 |
| $L_{S2}$ (mm) | 540.5 | 540.5 | 540.5 | 540.5 | 540.5 | 540.5 | 540.5 | 540.5 | 540.5 | 540.5 | 540.5 | 540.5 | 540.5 | 540.5 | 540.5 | 540.5 | 540.5 | 540.5 |
| $H_1$ (mm) | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 |
| $H_2$ (mm) | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 |
| $T_{Div}$ (mm) | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 |
| $T_{Stf}$ (mm) | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 |
| $N_{Div}$ | 3 | 3 | 3 | 3 | 3 | 3 | 3 | 3 | 3 | 5 | 5 | 5 | 5 | 5 | 5 | 5 | 5 | 5 |
| $N_{Stf}$ | 20 | 20 | 20 | 44 | 44 | 44 | 70 | 70 | 70 | 20 | 20 | 20 | 44 | 44 | 44 | 70 | 70 | 70 |
| SSR | 1.5 | 3 | 4 | 1.5 | 3 | 4 | 1.5 | 3 | 4 | 1.5 | 3 | 4 | 1.5 | 3 | 4 | 1.5 | 3 | 4 |

FIG. 13C

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|---|---|---|---|---|
| $L_{S1}$ (mm) | 415.3 | 415.3 | 415.3 | 415.3 | 415.3 | 415.3 | 415.3 | 415.3 | 415.3 | 415.3 | 415.3 | 415.3 | 415.3 | 415.3 | 415.3 | 415.3 | 415.3 | 415.3 |
| $L_{S2}$ (mm) | 463.6 | 463.6 | 463.6 | 463.6 | 463.6 | 463.6 | 463.6 | 463.6 | 463.6 | 463.6 | 463.6 | 463.6 | 463.6 | 463.6 | 463.6 | 463.6 | 463.6 | 463.6 |
| $H_1$ (mm) | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 |
| $H_2$ (mm) | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 | 51.8 |
| $\overline{T}_{Div}$ (mm) | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 |
| $\overline{T}_{Stf}$ (mm) | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 |
| $N_{Div}$ | 3.0 | 3.0 | 3.0 | 3.0 | 3.0 | 3.0 | 3.0 | 3.0 | 3.0 | 5.0 | 5.0 | 5.0 | 5.0 | 5.0 | 5.0 | 5.0 | 5.0 | 5.0 |
| $N_{Stf}$ | 20.0 | 20.0 | 20.0 | 44.0 | 44.0 | 44.0 | 70.0 | 70.0 | 70.0 | 20.0 | 20.0 | 20.0 | 44.0 | 44.0 | 44.0 | 70.0 | 70.0 | 70.0 |
| SSR | 1.5 | 3.0 | 4.0 | 1.5 | 3.0 | 4.0 | 1.5 | 3.0 | 4.0 | 1.5 | 3.0 | 4.0 | 1.5 | 3.0 | 4.0 | 1.5 | 3.0 | 4.0 |
| $\tan(\overline{\alpha})$ | 0.162 | 0.404 | 0.485 | 0.075 | 0.189 | 0.226 | 0.048 | 0.119 | 0.143 | 0.323 | 0.808 | 0.970 | 0.151 | 0.377 | 0.452 | 0.096 | 0.239 | 0.287 |
| $1/\cos(\overline{\alpha})$ | 1.013 | 1.079 | 1.111 | 1.003 | 1.018 | 1.025 | 1.001 | 1.007 | 1.010 | 1.051 | 1.286 | 1.393 | 1.011 | 1.069 | 1.098 | 1.005 | 1.028 | 1.040 |
| $Area_{Div}$ (mm²) | 3032 | 3032 | 3032 | 3032 | 3032 | 3032 | 3032 | 3032 | 3032 | 5054 | 5054 | 5054 | 5054 | 5054 | 5054 | 5054 | 5054 | 5054 |
| $Area_{Stf}$ (mm²) | 464 | 494 | 509 | 1010 | 1025 | 1033 | 1605 | 1614 | 1619 | 432 | 528 | 573 | 915 | 966 | 993 | 1445 | 1479 | 1497 |
| $Area_{Air}$ (mm²) | 22764 | 22764 | 22764 | 22764 | 22764 | 22764 | 22764 | 22764 | 22764 | 22764 | 22764 | 22764 | 22764 | 22764 | 22764 | 22764 | 22764 | 22764 |
| Air Blockage Ratio | 0.1536 | 0.1549 | 0.1556 | 0.1776 | 0.1782 | 0.1786 | 0.2037 | 0.2041 | 0.2043 | 0.2410 | 0.2452 | 0.2472 | 0.2622 | 0.2645 | 0.2656 | 0.2855 | 0.2870 | 0.2878 |

FIG. 14A

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|---|---|---|---|---|
| $L_{S1}$ (mm) | 437.9 | 437.9 | 437.9 | 437.9 | 437.9 | 437.9 | 437.9 | 437.9 | 437.9 | 437.9 | 437.9 | 437.9 | 437.9 | 437.9 | 437.9 | 437.9 | 437.9 | 437.9 |
| $L_{S2}$ (mm) | 511.0 | 511.0 | 511.0 | 511.0 | 511.0 | 511.0 | 511.0 | 511.0 | 511.0 | 511.0 | 511.0 | 511.0 | 511.0 | 511.0 | 511.0 | 511.0 | 511.0 | 511.0 |
| $H_1$ (mm) | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 |
| $H_2$ (mm) | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 | 82.6 |
| $\overline{T}_{Div}$ (mm) | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 |
| $\overline{T}_{Stf}$ (mm) | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 |
| $N_{Div}$ | 3.0 | 3.0 | 3.0 | 3.0 | 3.0 | 3.0 | 3.0 | 3.0 | 3.0 | 5.0 | 5.0 | 5.0 | 5.0 | 5.0 | 5.0 | 5.0 | 5.0 | 5.0 |
| $N_{Stf}$ | 20.0 | 20.0 | 20.0 | 44.0 | 44.0 | 44.0 | 70.0 | 70.0 | 70.0 | 20.0 | 20.0 | 20.0 | 44.0 | 44.0 | 44.0 | 70.0 | 70.0 | 70.0 |
| SSR | 1.5 | 3.0 | 4.0 | 1.5 | 3.0 | 4.0 | 1.5 | 3.0 | 4.0 | 1.5 | 3.0 | 4.0 | 1.5 | 3.0 | 4.0 | 1.5 | 3.0 | 4.0 |
| $\tan(\overline{\alpha})$ | 0.109 | 0.274 | 0.328 | 0.051 | 0.128 | 0.153 | 0.032 | 0.081 | 0.097 | 0.219 | 0.547 | 0.656 | 0.102 | 0.255 | 0.306 | 0.065 | 0.162 | 0.194 |
| $1/\cos(\overline{\alpha})$ | 1.006 | 1.037 | 1.052 | 1.001 | 1.008 | 1.012 | 1.001 | 1.003 | 1.005 | 1.024 | 1.140 | 1.196 | 1.005 | 1.032 | 1.046 | 1.002 | 1.013 | 1.019 |
| $Area_{Div}$ (mm²) | 3274 | 3274 | 3274 | 3274 | 3274 | 3274 | 3274 | 3274 | 3274 | 5456 | 5456 | 5456 | 5456 | 5456 | 5456 | 5456 | 5456 | 5456 |
| $Area_{Stf}$ (mm²) | 777 | 801 | 813 | 1701 | 1712 | 1719 | 2704 | 2711 | 2715 | 742 | 827 | 868 | 1604 | 1647 | 1669 | 2544 | 2571 | 2586 |
| $Area_{Air}$ (mm²) | 39190 | 39190 | 39190 | 39190 | 39190 | 39190 | 39190 | 39190 | 39190 | 39190 | 39190 | 39190 | 39190 | 39190 | 39190 | 39190 | 39190 | 39190 |
| Air Blockage Ratio | 0.1034 | 0.1040 | 0.1043 | 0.1269 | 0.1272 | 0.1274 | 0.1525 | 0.1527 | 0.1528 | 0.1582 | 0.1603 | 0.1614 | 0.1801 | 0.1812 | 0.1818 | 0.2041 | 0.2048 | 0.2052 |

FIG. 14B

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|---|---|---|---|---|
| $L_{S1}$ (mm) | 489.5 | 489.5 | 489.5 | 489.5 | 489.5 | 489.5 | 489.5 | 489.5 | 489.5 | 489.5 | 489.5 | 489.5 | 489.5 | 489.5 | 489.5 | 489.5 | 489.5 | 489.5 |
| $L_{S2}$ (mm) | 540.5 | 540.5 | 540.5 | 540.5 | 540.5 | 540.5 | 540.5 | 540.5 | 540.5 | 540.5 | 540.5 | 540.5 | 540.5 | 540.5 | 540.5 | 540.5 | 540.5 | 540.5 |
| $H_1$ (mm) | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 |
| $H_2$ (mm) | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 | 59.7 |
| $\overline{T}_{Div}$ (mm) | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 |
| $\overline{T}_{Stf}$ (mm) | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 | 0.51 |
| $N_{Div}$ | 3.0 | 3.0 | 3.0 | 3.0 | 3.0 | 3.0 | 3.0 | 3.0 | 3.0 | 5.0 | 5.0 | 5.0 | 5.0 | 5.0 | 5.0 | 5.0 | 5.0 | 5.0 |
| $N_{Stf}$ | 20.0 | 20.0 | 20.0 | 44.0 | 44.0 | 44.0 | 70.0 | 70.0 | 70.0 | 20.0 | 20.0 | 20.0 | 44.0 | 44.0 | 44.0 | 70.0 | 70.0 | 70.0 |
| SSR | 1.5 | 3.0 | 4.0 | 1.5 | 3.0 | 4.0 | 1.5 | 3.0 | 4.0 | 1.5 | 3.0 | 4.0 | 1.5 | 3.0 | 4.0 | 1.5 | 3.0 | 4.0 |
| tan(α) | 0.164 | 0.411 | 0.493 | 0.077 | 0.192 | 0.230 | 0.049 | 0.121 | 0.146 | 0.329 | 0.822 | 0.986 | 0.153 | 0.383 | 0.460 | 0.097 | 0.243 | 0.292 |
| 1/cos(α) | 1.013 | 1.081 | 1.115 | 1.003 | 1.018 | 1.026 | 1.001 | 1.007 | 1.011 | 1.053 | 1.294 | 1.404 | 1.012 | 1.071 | 1.101 | 1.005 | 1.029 | 1.042 |
| $Area_{Div}$ (mm²) | 3554 | 3554 | 3554 | 3554 | 3554 | 3554 | 3554 | 3554 | 3554 | 5923 | 5923 | 5923 | 5923 | 5923 | 5923 | 5923 | 5923 | 5923 |
| $Area_{Stf}$ (mm²) | 546 | 582 | 600 | 1188 | 1206 | 1216 | 1887 | 1899 | 1905 | 518 | 636 | 690 | 1094 | 1158 | 1191 | 1729 | 1771 | 1792 |
| $Area_{Air}$ (mm²) | 30746 | 30746 | 30746 | 30746 | 30746 | 30746 | 30746 | 30746 | 30746 | 30746 | 30746 | 30746 | 30746 | 30746 | 30746 | 30746 | 30746 | 30746 |
| Air Blockage Ratio | 0.1333 | 0.1345 | 0.1351 | 0.1542 | 0.1548 | 0.1551 | 0.1770 | 0.1773 | 0.1775 | 0.2095 | 0.2133 | 0.2151 | 0.2282 | 0.2303 | 0.2314 | 0.2489 | 0.2502 | 0.2509 |

FIG. 14C

HEAT EXCHANGERS FOR GAS TURBINE ENGINES

TECHNICAL FIELD

The present subject matter relates generally to heat exchangers and, more specifically, to heat exchangers for gas turbine engines.

BACKGROUND

A gas turbine engine (e.g., a turbofan engine, a turboprop engine, etc.) typically includes a propeller/fan and an engine core to drive the propeller/fan to produce thrust. The engine core includes one or more compressor(s), a combustor, and one or more turbine(s) in a serial flow arrangement. Gas turbine engines use oil and other fluids. Some gas turbine engines include heat exchangers to cool these fluids during operation of the gas turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 4 is perspective cross-sectional view of the example heat exchanger of FIG. 3.

FIG. 5 is an enlarged view of a portion of the example heat exchanger of FIG. 4 showing example skewed stiffeners.

FIGS. 8A and 8B are tables of chord lengths of air passages for example heat exchanger designs.

FIG. 9 is a table of modal frequency analysis on example heat exchanger designs having different average skewed stiffener ratios.

FIGS. 13A, 13B, and 13C are tables of example heat exchanger designs.

FIGS. 14A, 14B, and 14C are tables of the example heat exchanger designs of FIGS. 13A, 13B, and 13C, respectively, with additional parameters calculated.

DETAILED DESCRIPTION

Figure 1:
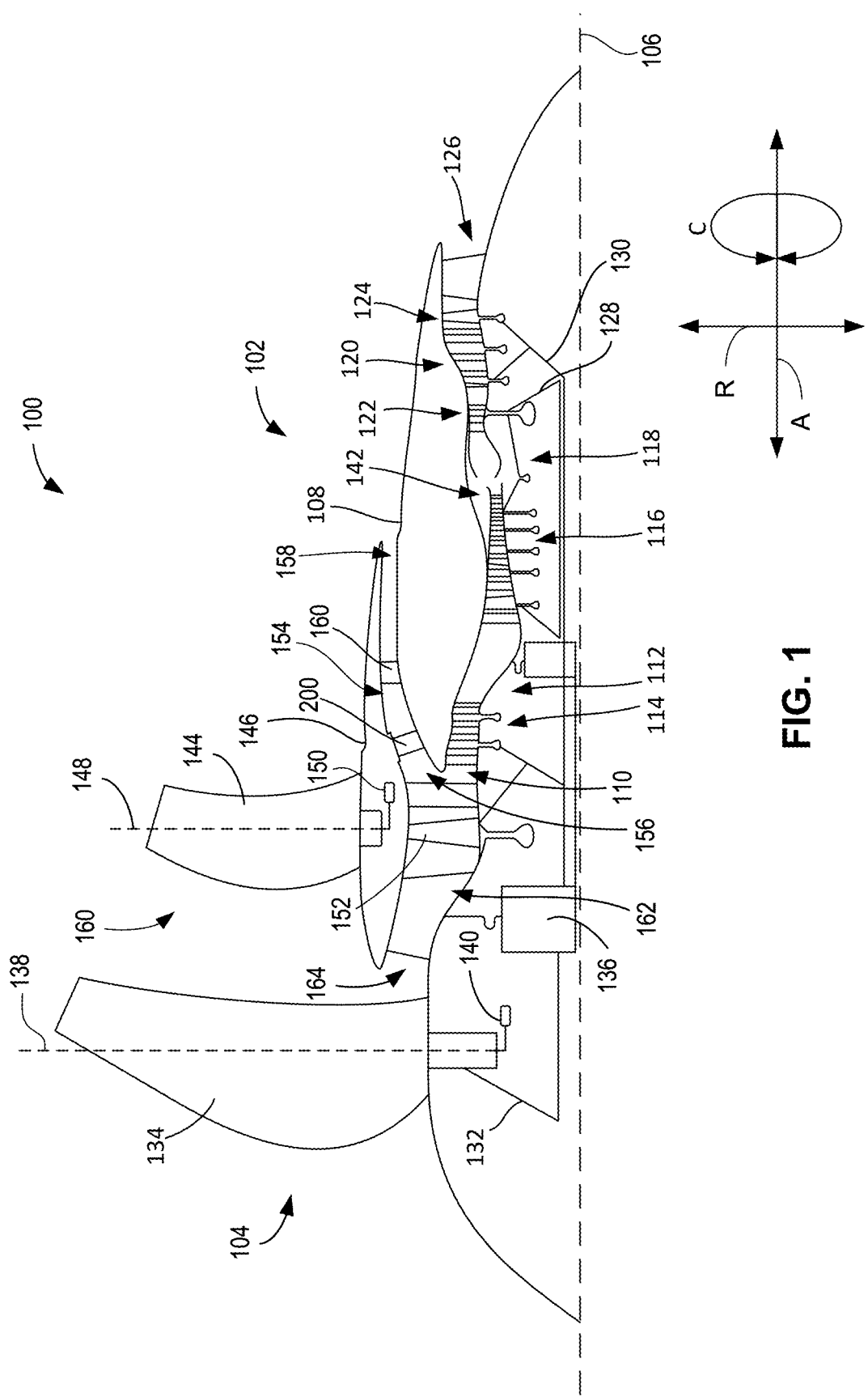
FIG. 1 is a schematic cross-sectional view of an example gas turbine engine in which example heat exchangers disclosed herein can be implemented.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Gas turbine engines, such as those used on aircraft, include a fan/propeller and turbomachinery (sometimes referred to as an engine core) used to drive the fan/propeller to produce thrust. The turbomachinery includes one or more compressor sections, a combustion section, and one or more turbine sections. The compressor sections have one or more stages of rotor blades and stator vanes arranged in an alternating sequence in the axial direction. The rotor blades are rotated at a relatively high speed to progressively increase the pressure of the incoming airflow to the combustion section. The high pressure air is mixed with fuel and ignited in the combustion section to product high pressure/temperature combustion gases. The turbine sections also have one or more stages of rotor blades and stator vanes arranged to convert the high temperature/pressure combustion gases to rotational motion to drive the compressor sections and the fan/propeller to produce thrust.

Gas turbine engines use oil to lubricate the rotating parts in the engine. The oil can become relatively hot, which can reduce the effectiveness of the oil. Therefore, many gas turbine engines include one or more heat exchangers that are used to cool and/or otherwise reduce the temperature of the oil (e.g., to maintain oil temperature at a desired range of 37.8° C.<T<148.9° C.). The heat exchangers are often installed in air passages, such as a fan duct, of the engine and therefore using the passing air to transfer heat away from the oil flowing through the heat exchanger.

Known heat exchangers include inlet and outlet plenums, a plurality of divider plates between the plenums, and radial fins between the divider plates. Oil flows through the divider plates between the inlet and outlet plenums. Air flows through passages between the divider plates and the radial fins to absorb heat from the passing oil. The radial fins help to increase surface area and therefore increase heat transfer. In known heat exchangers, the radial fins are arranged perpendicular to the divider plates. This arrangement of the divider plates and the radial fins is not structurally rigid and therefore requires the use a structural box or frame to support engine loads and provide dynamic stiffness. However, this structural box/frame adds weight to the engine as well as creates an obstruction in the air flow path and, thus, can negatively impact engine performance and efficiency.

Disclosed herein are example heat exchangers with stiffeners between the divider plates that not only act as radial fins to increase surface area (and therefore heat transfer) but also add structural rigidity and stiffness to the heat exchanger. In particular, at least some of the stiffeners are skewed, meaning they are angled at non-perpendicular angles relative to the divider plates. This skewing or angling enables the stiffeners to act as structural braces that distribute loads (e.g., shear loads, normal loads, axial loads) and therefore strengthens the heat exchanger design. As such, in some examples, the heat exchanger is boxless or frameless, i.e., does not require the use of an outer structural box/frame to support the divider plates and stiffeners. This reduces weight and flow obstruction and therefore increases engine performance. Disclosed herein are specific stiffener arrangements that have been found to meet mechanical, aerodynamic, and thermal design needs. In particular, the disclosed heat exchangers are structurally designed to withstand the loads and stresses encountered during operation of the engine. Further, the disclosed heat exchangers are designed to account for aerodynamic effects to ensure sufficient air flow through the heat exchanger, and well as provide sufficient thermal transfer for the oil.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first", "second", "third", "fourth", etc. can be used interchangeably to distinguish one component from another and are not intended to signify location or importance of the individual components.

The terms "forward" and "aft" as may be used herein refer to relative positions within a gas turbine engine and refer to the normal operational attitude or direction of travel of the gas turbine engine. For example, with regard to a gas turbine engine, forward refers to a position relatively closer to the nose of an aircraft and aft refers to a position relatively closer to a tail of the aircraft.

The terms "upstream" and "downstream" refer to a direction with respect to a direction of fluid flow along a flowpath.

The term "fluid" refers to a gas or a liquid.

The singular forms "a", "an", and "the" include plural references unless the context clearly dictates otherwise.

Connection references (e.g., attached, coupled, connected, and joined) are to be construed broadly and can include intermediate structural elements between a collection of elements and relative movement between elements unless otherwise indicated. As such, connection references do not necessarily infer those two elements are directly connected and in fixed relation to one another. The exemplary drawings are for purposes of illustration only and the dimensions, positions, order and relative sizes reflected in the drawings attached hereto can vary.

A rotational axis (denoted A) refers to an axis about which the turbine engine rotates and is aligned with the engine centerline.

A radial axis (denoted R) refers to an axis that extends perpendicular to the rotational axis A.

As used herein, "axial," "axially," or "axial direction" refers to a location or direction with respect to the rotational axis A.

As used herein, "radial," "radially," or "radial direction" refers to a location or direction with respect to the radial axis R.

As used herein, the term "radial distance" refers to a distance measured from the rotational axis A along the radial axis R or parallel to the radial axis R.

As used herein, "circumferential," "circumferentially," or "circumferential direction" refers to an annular dimension circumscribing the rotational axis A.

As used herein, "skewed" is defined to mean that a first part is angled from a perpendicular orientation relative to a second part. In other words, the first part is non-perpendicular to the second part.

Referring now to the drawings, FIG. 1 is a schematic cross-sectional view of an example gas turbine engine 100 that can incorporate various example heat exchangers disclosed herein. The example gas turbine engine 100 can be implemented on an aircraft and therefore referred to as an aircraft engine. The gas turbine engine 100 includes a turbomachine 102 (sometimes referred to as an engine core) and a fan 104 driven by the turbomachine 102 to produce forward thrust. In this example, the gas turbine engine 100 is an unducted turbine engine, also referred to sometimes as a turboprop engine or open rotor engine. This type of engine does not include a nacelle or cowl around the fan 104. However, any of the example teachings disclosed herein can also be implemented in connection with other configurations of engines such as turbofan engines, turbojet engines, etc. Further, the example teachings disclosed herein can be implemented on other types of engines, such as non-aircraft engines (e.g., power generation engines).

As shown in FIG. 1, the gas turbine engine 100 and/or the turbomachine 102 define a longitudinal or axial centerline axis 106 extending therethrough for reference. FIG. 1 also includes an annotated directional diagram with reference to an axial direction A, a radial direction R, and a circumferential direction C. In general, as used herein, the axial direction A is a direction that extends generally parallel to the axial centerline axis 106, the radial direction R is a direction that extends orthogonally outward from or inward toward the axial centerline axis 106, and the circumferential direction C is a direction that extends concentrically around the axial centerline axis 106. Further, as used herein, the term "forward" refers to a direction along the centerline axis 106 in the direction of movement of the gas turbine engine 100, such as to the left in FIG. 1, while the term "rearward" refers to a direction along the centerline axis 106 in the opposite direction, such as to the right in FIG. 1.

The gas turbine engine 100 includes a core cowl 108 (which may also be referred to as an annular casing) that defines a core inlet 110. The core cowl 108 can be formed from a single casing or multiple casings coupled together. The core cowl 108 encloses, in serial flow relationship, a compressor section 112 having a booster or low pressure compressor 114 ("LP compressor 114") and a high pressure compressor 116 ("HP compressor 116"), a combustion section 118 (which may also be referred to as the combustor), a turbine section 120 having a high pressure turbine 122 ("HP turbine 122") and a low pressure turbine 124 ("LP turbine 124"), and an exhaust section 126.

The gas turbine engine 100 includes a high pressure shaft 128 ("HP shaft 128") that drivingly couples the HP turbine 122 and the HP compressor 116. The gas turbine engine 100 also includes a low pressure shaft 130 ("LP shaft 130") that drivingly couples the LP turbine 124 and the LP compressor 114. The LP shaft 130 also couples to a fan shaft or hub 132. The fan 104 includes a plurality of fan blades 134 (sometimes referred to as propeller blades) that are coupled to and extend radially outward from the fan shaft 132. In some examples, the LP shaft 130 may couple directly to the fan shaft 132 (e.g., a direct-drive configuration). In alternative configurations, the LP shaft 130 may couple to the fan shaft 132 via a gearbox or transmission 136 (e.g., a gear reduction). In this example, the fan blades 134 are variable, meaning the pitch of the fan blades 134 can be varied. For example, each of the fan blades 134 can rotate about a respective radial axis 138 by one or more pitch actuators 140.

While in this example the gas turbine engine 100 includes two compressors and two turbines, in other examples, the gas turbine engine 100 may include one compressor and one turbine. Further, in other examples, the gas turbine engine 100 can include more than two compressors and turbines. In such examples, the gas turbine engine 100 may include more than two drive shafts or spools.

During operation of the gas turbine engine 100, air is accelerated by the fan blades 134. A portion of the air flows into the core inlet 110 of the turbomachine 102 and into the LP compressor 114. One or more sequential stages of LP compressor stator vanes and LP compressor rotor blades coupled to the LP shaft 130 progressively compress the air flowing through the LP compressor 114 en route to the HP compressor 116. Next, one or more sequential stages of HP compressor stator vanes and HP compressor rotor blades coupled to the HP shaft 128 further compress the air flowing through the HP compressor 116. This provides compressed air to the combustion section 118 where the air is mixed with fuel and ignited to produce high pressure combustion gases.

The combustion gases flow through the HP turbine 122 where one or more sequential stages of HP turbine stator vanes and HP turbine rotor blades coupled to the HP shaft 128 extract a first portion of kinetic and/or thermal energy. This energy extraction supports operation of the HP compressor 116. The combustion gases then flow through the LP turbine 124 where one or more sequential stages of LP turbine stator vanes and LP turbine rotor blades coupled to the LP shaft 130 extract a second portion of thermal and/or kinetic energy therefrom. This energy extraction causes the LP shaft 130 to rotate, which supports operation of the LP compressor 114 and rotation of the fan shaft 132 and, therefore, rotating the fan blades 134 to produce forward thrust. The combustion gases then exit the turbomachine 102 through the exhaust section 126 thereof, which also produces forward thrust.

Accordingly, the turbomachine 102 defines a working gas flowpath or core duct 142 that extends between the core inlet 110 and the exhaust section 126. The core duct 142 is an annular duct positioned generally inward of the core cowl 108 along the radial direction R. The core duct 142 (e.g., the working gas flowpath through the turbomachine 102) may be referred to as a second stream.

In the illustrated example, the gas turbine engine 100 also includes outlet guide vanes (OGVs) 144 coupled to and extending radially outward from a fan cowl 146. The OGVs 144 are downstream of the fan 104. The air exiting the fan 104 is partially swirling in a circumferential direction. The OGVs 144 help to redirect the air to a more rearward or axial direction to provide forward thrust. In this example, the OGVs 144 are variable, meaning they can pitch about their radial axis 148 via one or more pitch actuators 150. However, in other examples the OGVs 144 may be non-variable.

As shown in FIG. 1, in addition to the fan 104, which is unducted, a ducted fan 152 is included aft of the fan 104, such that the gas turbine engine 100 includes both a ducted and an unducted fan that both serve to generate thrust through the movement of air without passage through at least a portion of the turbomachine 102. The ducted fan 152 is, for the embodiment depicted, driven by the LP turbine 124 via the LP shaft 130.

The fan cowl 146 annularly encases at least a portion of the core cowl 108 and is generally positioned outward of at least a portion of the core cowl 108 along the radial direction R. Particularly, a downstream section of the fan cowl 146 extends over a forward portion of the core cowl 108 to define a fan duct flowpath, or simply a fan duct 154. According to this embodiment, the fan flowpath or fan duct 154 may be understood as forming at least a portion of a third stream of the gas turbine engine 100.

Incoming air enters through the fan duct 154 through a fan duct inlet 156 and may exit through a fan exhaust nozzle 158 to produce propulsive thrust. The fan duct 154 is an annular duct positioned generally outward of the core duct 142 along the radial direction R. The fan cowl 146 and the core cowl 108 are connected together and supported by a plurality of substantially radially-extending, circumferentially-spaced stationary struts 160. The stationary struts 160 may each be aerodynamically contoured to direct air flowing thereby. Other struts in addition to the stationary struts 160 may be used to connect and support the fan cowl 146 and/or core cowl 108.

The gas turbine engine 100 also defines or includes an inlet duct 162, which may be considered forming a first stream of the gas turbine engine 100. The inlet duct 162 extends between an engine inlet 164 and the core inlet 110/fan duct inlet 156. The engine inlet 164 is defined generally at the forward end of the fan cowl 146 and is positioned between the fan 104 and the OGVs 144 along the axial direction A. The inlet duct 162 is an annular duct that is positioned inward of the fan cowl 146 along the radial direction R. Air flowing downstream along the inlet duct 162 is split, not necessarily evenly, into the core duct 142 and the fan duct 154 by a fan duct splitter or leading edge of the core cowl 108. The ducted fan 152 is positioned at least partially in the inlet duct 162. Airflow from the ducted fan 152 is split between the fan duct 154 and the core duct 142.

In some examples, the gas turbine engine 100 may include one or more heat exchangers to cool and/or otherwise reduce the temperature of a fluid, such as oil. In some examples, the heat exchangers may be disposed in the air passageways of the gas turbine engine 100. For example, as shown in FIG. 1, a heat exchanger 200 is disposed in the fan duct 154. Air passing through the fan duct 154 may be relatively cooler (e.g., lower temperature) than one or more fluids (e.g., oil) utilized in the gas turbine engine 100. Therefore, the heat exchanger 200 uses this cooler air as a resource for removing heat from the fluid (e.g., oil). Many of the example heat exchangers disclosed here are described in connection with the fluid being oil. However, it is understood that the heat exchangers disclosed herein can be used for cooling other types of fluids, such as fuel, heat transfer fluid (e.g., cryogenic nitrogen, cryogenic hydrogen, super critical $CO_2$), hydraulic fluid, etc.

Figure 2:
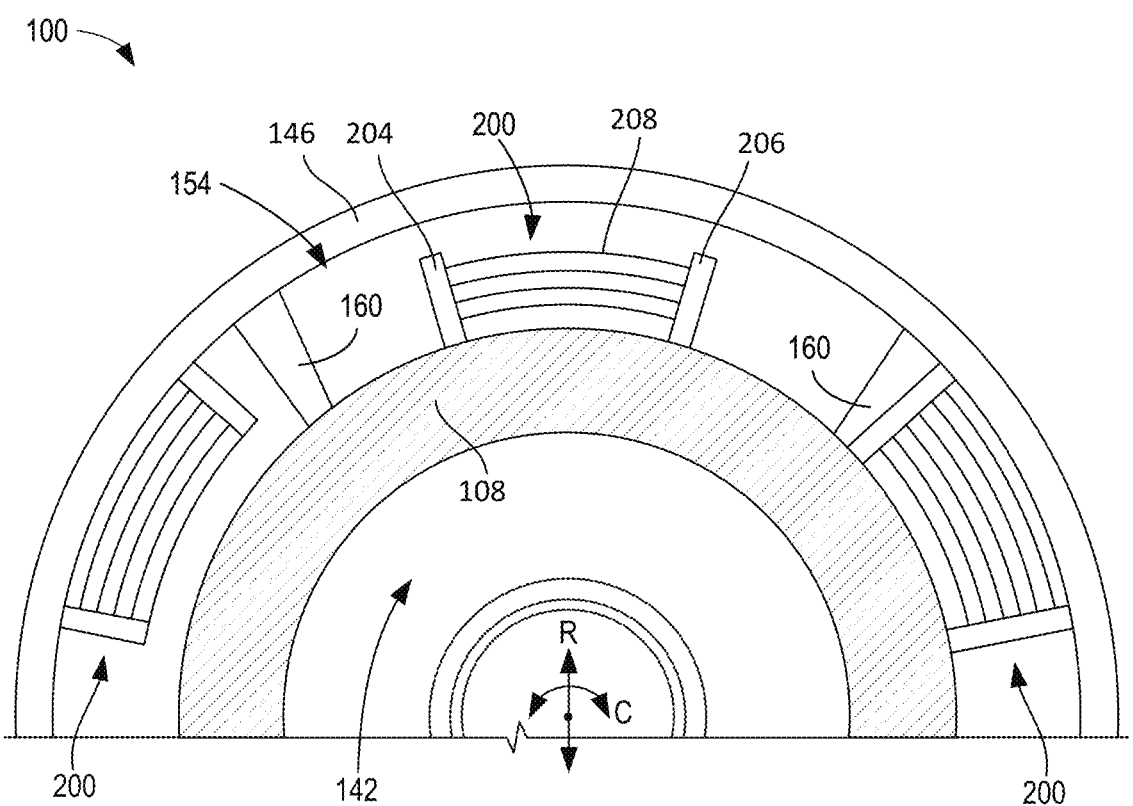
FIG. 2 is an aft-looking axial view of a section of the example gas turbine engine of FIG. 1 showing example heat exchangers in an example fan duct.

FIG. 2 is an axial cross-sectional view of the gas turbine engine 100 showing a plurality of heat exchangers 200 supported therein. In the illustrated example, the heat exchangers 200 are circumferentially arranged within the fan duct 154 and circumferentially spaced from each other. The heat exchangers 200 may be coupled to the gas turbine engine 100 in a variety of ways. As an example, as shown, one or more of the heat exchangers 200 may be coupled to the fan cowl 146 and extend radially inward toward the core cowl 108. Additionally or alternatively, one or more of the heat exchangers 200 can be coupled to the core cowl 108 and extend radially inward toward the fan cowl 146. Additionally or alternatively, one or more of the heat exchangers 200 can be coupled to one or more of the stationary struts 160 that extend between the core cowl 108 and the fan cowl 146.

Each of the heat exchangers 200 includes a first plenum 204, a second plenum 206, and a plurality of divider plates 208 coupled to and extending between the first and second plenums 204, 206, which are labeled in connection with the middle heat exchanger 200 in FIG. 2. The divider plates 208 are spaced apart from each other. One of the first or second plenums 204, 206 is an inlet plenum and the other of the first or second plenums 204, 206 is an outlet plenum. Oil is supplied to inlet plenum and flows through internal passages (shown in further detail herein) in the divider plates 208 to the outlet plenum. Air flowing through the passages between the divider plates 208 causes heat transfer between the oil and the air to help cool and/or otherwise reduce the temperature of the oil.

In the illustrated example, each of the heat exchangers 200 is arc-shaped and curves in the circumferential direction. In some examples, each of the heat exchangers 200 has the same arc length. In other examples, different ones of the heat exchangers 200 can have arc lengths that are smaller or larger than other ones of the heat exchangers 200.

Figure 3:
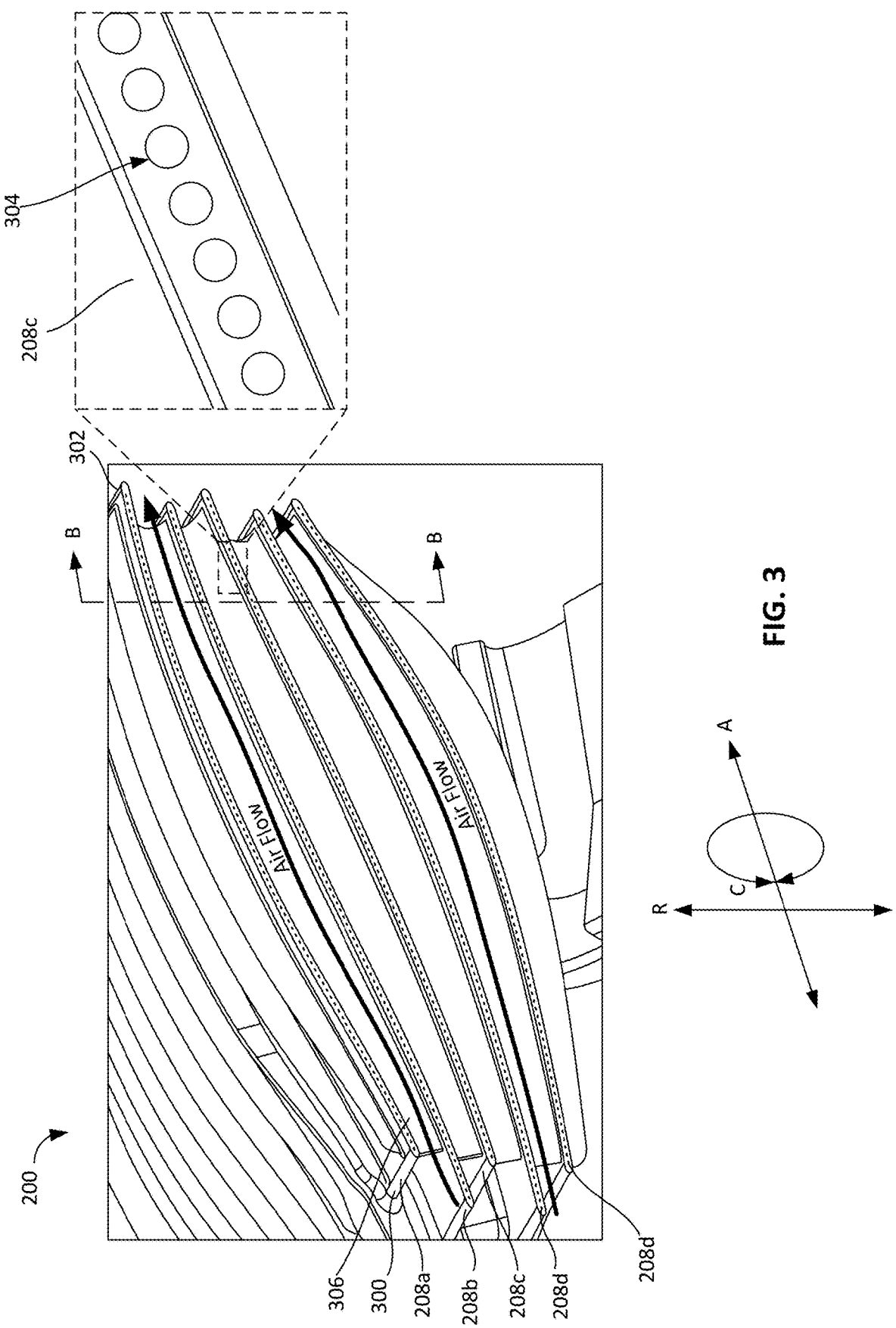
FIG. 3 is a perspective cross-sectional view of an example heat exchanger that can be implemented in the example gas turbine engine of FIGS. 1 and 2.

FIG. 3 is a perspective cross-sectional view of an example heat exchanger 200 that can be implemented as one of the heat exchangers 200 of FIG. 2. As disclosed above, the heat exchanger 200 includes the plurality of divider plates 208 (labeled 208a-208e). The divider plates 208 extend generally in the circumferential direction and the axial direction, and are spaced apart from each other in the radial direction. Air flowing through the fan duct 154 (FIGS. 1 and 2) flows between the divider plates 208, as shown by two example air flow lines, and over the top and bottom surfaces of the divider plates 208. In the illustrated example of FIG. 3, the heat exchanger 200 includes five divider plates, labeled 208a-208e. However, in other examples, the heat exchanger 200 can include more or fewer divider plates. Each of the divider plates 208a-208e has a forward edge 300 and an aft edge 302 (labeled in connection with the first divider plate 208a). Air flow enters between the forward edges 300, flows between the divider plates 208a-208e, and exits at the aft edges 302.

Each of the divider plates 208a-208e has a plurality of internal passages (e.g., channels, conduits) traversing through the divider plates 208a-208e in the circumferential direction for a fluid (e.g., oil) to flow between the first and second plenums 204, 206 (FIG. 2). For example, as shown in the callout in FIG. 3, the third divider plate 208c has internal passages 304 (one of which is referenced in FIG. 3). The internal passages 304 route fluid, such as oil, through the divider plates 208a-208e. The first and second plenums 204, 206 (FIG. 2) have internal passages that fluidly connect to all of the internal passages 304 of the divider plates 208a-208e. Oil is pumped from one of the plenums 204, 206, through the internal passages 304 of the divider plates 208a-208e, and out to the other plenum 204, 206. As high speed air flows between and along the divider plates 208a-208e, heat transfer occurs between the oil and the air, cooling the oil.

In the illustrated example, the heat exchanger 200 also includes a plurality of stiffeners 306 (one of which is referenced in FIG. 3) between each adjacent pair of the divider plates 208a-208e. The stiffeners 306 generally extend in the radial direction and the axial direction. The stiffeners 306 divide the space between adjacent divider plates 208a-208e into smaller air passages. The stiffeners 306 further enhance heat transfer between the oil and the air by creating additional surface area. The stiffeners 306 also provide strength and rigidity to the heat exchanger 200, as disclosed in further detail here.

FIG. 4 is a perspective cross-sectional view of the example heat exchanger taken along line B-B of FIG. 3, looking generally in the streamwise direction. As shown in FIG. 4, each of the divider plates 208a-208e is curved or arcuate between the first and second plenums 204, 206. As disclosed above, the heat exchanger 200 includes a plurality of stiffeners 306 (three of which are referenced in FIG. 4) between the divider plates 208a-208e. Each of the stiffeners 306 is coupled to and extends between two adjacent ones of the divider plates 208a-208e. In some examples, the stiffeners 306 and the divider plates 208a-208e are constructed as a single unitary part or component (e.g., a monolithic structure), such that the stiffeners 306 are integrally formed with the divider plates 208a-208e. For example, the heat exchanger 200, including the plenums 204, 206, the divider plates 208a-208e, and the stiffeners 306 can be constructed via additive manufacturing (sometimes referred to as 3D printing). Additive manufacturing involves constructing an object by fusing layers of a material together. In other examples, the stiffeners 306 are separate parts that are coupled to the adjacent divider plates 208a-208e. For example, the stiffeners can be welded or brazed at their ends to the divider plates 208a-208e. As shown in FIG. 4, the arrangement of the divider plates 208a-208e and the stiffeners 306 form a plurality of air passages 400 (two of which are referenced in FIG. 4). Each air passage 400 is defined between two adjacent divider plates 208a-208e, a stiffener 306, and one of the plenums 204, 206, such as the first air passage i=1, or defined between two adjacent divider plates 208a-208e and two adjacent stiffeners 306, such as the second air passage i=2, the third air passage i=3, the fourth air passage i=4, etc. The heat exchanger 200 can include any number of air passages 400. The air passages 400 are number i=1 through i=N.

In the illustrated example of FIG. 4, at least one of the stiffeners 306 are skewed, meaning the stiffeners 306 are not perpendicular to a connecting one of the divider plates 208a-208e. For example, FIG. 5 is enlarged cross-sectional view showing two example stiffeners 306a, 306b between the first and second divider plates 208a, 208b. The first stiffener 306a is coupled to the first divider plate 208a at a first node 308a (e.g., a joint, a connection point) and coupled to the second divider plate 208b at a second node 308b. The first stiffener 306a is angled at a first angle $\alpha_a$ relative to a perpendicular orientation (shown in dashed lines) of the first and second divider plates 208a, 208b. The second stiffener 306b is similarly angled at a second angle $\alpha_b$ relative to the first and second divider plates 208a, 208b. In this example, the first and second stiffeners 306a, 306b are angled in an opposite or reverse directions relative to each other. In some examples, the first angle $\alpha_a$ and the second angle $\alpha_b$ are the same, but in other examples can be different. In some examples, the first and second stiffeners 306a, 306b form a pair of stiffeners. As shown in FIG. 4, the arrangement of the stiffeners 306 includes repeating pairs of stiffeners 306, and each pair of the stiffeners 306 includes two stiffeners 306 skewed in opposite or reverse directions. This skewed design provides strength and rigidity to the heat exchanger 200 that limits or reduces stresses that can cause bending. In particular, the skewed stiffeners form angled supports or braces that reduce shear forces and racking. As such, in some examples, the heat exchanger 200 does not require an outer structural frame or box as seen in known designs. Eliminating the need for an outer frame or box greatly reduces costs, weight, and reduces aerodynamic obstructions in the flow path of the engine. Further, the use of skewed stiffeners increases heat transfer surface area, which enables a smaller and lighter heat exchanger design for a given heat load. The use of skewed stiffeners increases the air side pressure drop between forward and aft ends of the heat exchanger, which can have a negative performance impact. However, the net benefits achieved with the skewed stiffeners result in a more efficient heat exchanger and therefore a more efficient engine.

The stiffeners 306 can be configured in various arrangements or patterns. For example, FIG. 6A shows an example arrangement referred to herein as an offset node arrangement. In an offset node arrangement, the nodes or connections of the stiffeners 306 to the divider plates 208a-208e are offset from each other. For instance, the nodes or connection points where the first and second stiffeners 306a, 306b connect to the second divider plate 208b are offset from the third and fourth stiffeners 306c, 306d that are connected to the opposite side of the second divider plate 208b. Therefore, the nodes are offset from each other.

Figure 6B:
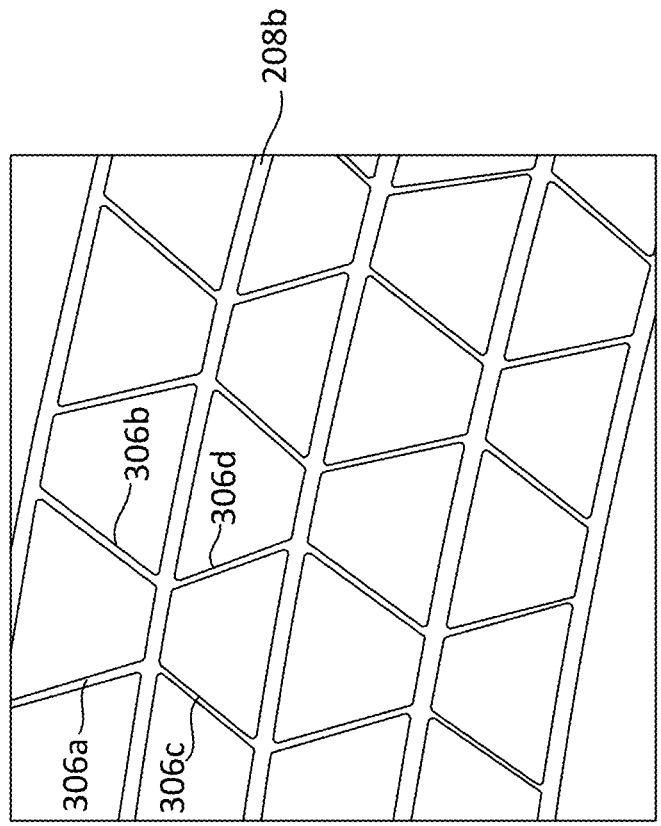
FIG. 6B is an example common node arrangement of skewed stiffeners that can be implemented in an example heat exchanger.
Figure 6A:
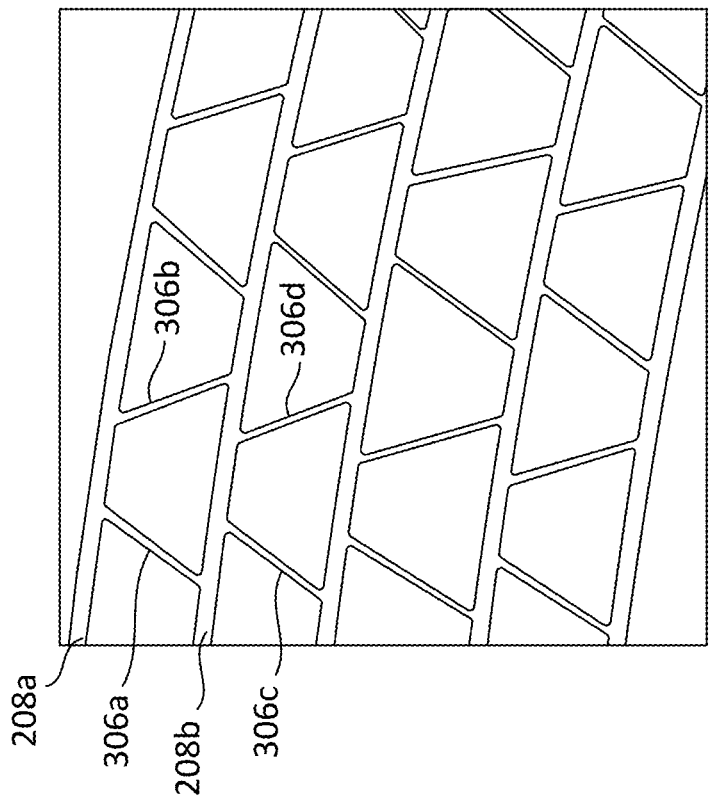
FIG. 6A is an example offset node arrangement of skewed stiffeners that can be implemented in an example heat exchanger.

FIG. 6B shows another example arrangement referred to herein as a common node arrangement. In the illustrated arrangement, the node or connection for each stiffener 306 to a divider plate 208a-208e is common to another node or connection of a stiffener 306. For instance, the nodes where the first and second stiffeners 306a, 306b connect to the second divider plate 208b are the same as the nodes of the third and fourth stiffeners 306c, 306d, respectively, on the opposite side of the second divider plate 208b. Therefore, the nodes share a common point on the second divider plate 208b.

Figure 7:
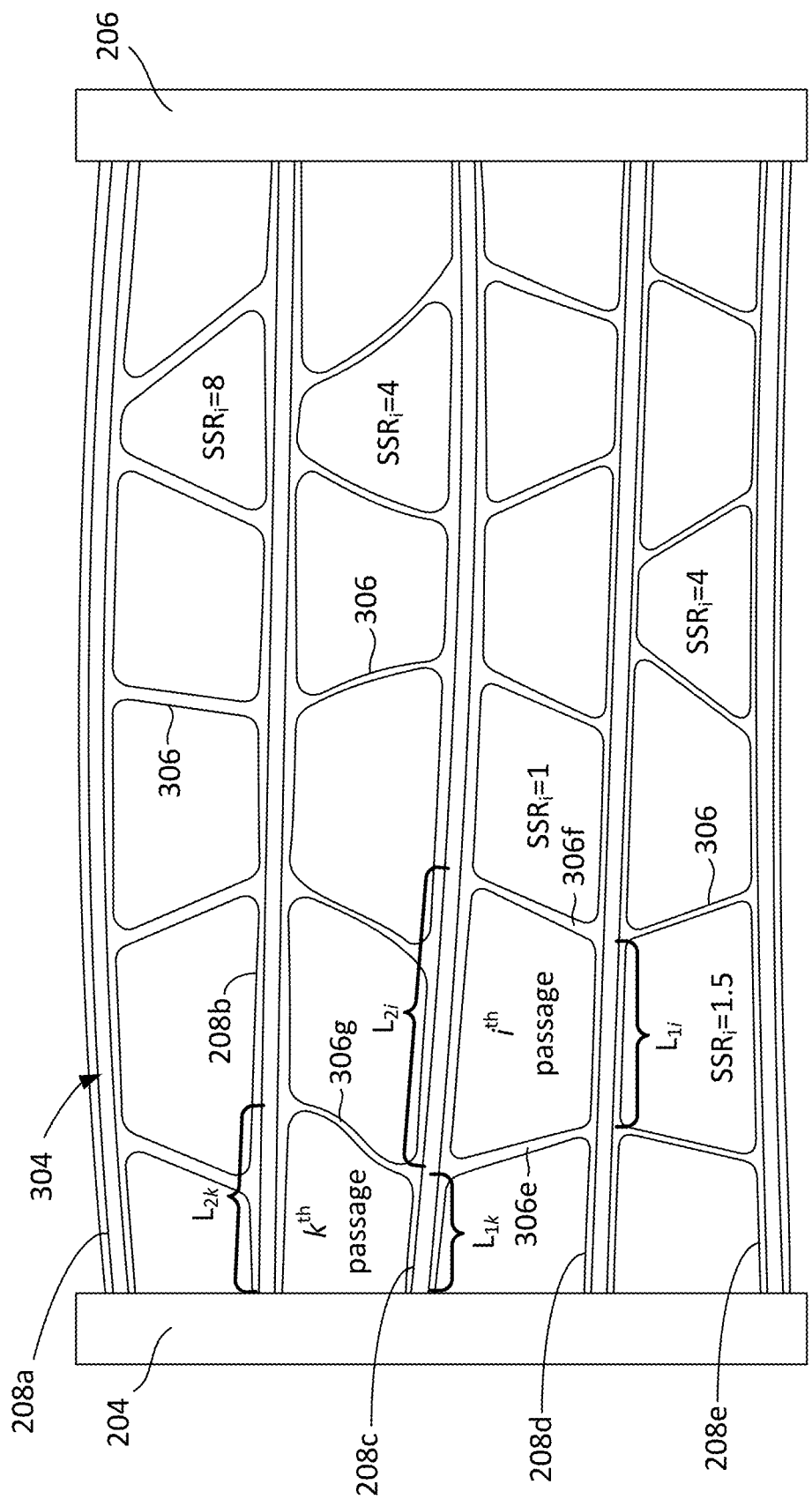
FIG. 7 is a cross-sectional view of an example stiffener and divider plate arrangement that can be implemented in an example heat exchanger.

The example heat exchanger 200 can also have stiffener arrangements with different orientations, shapes, and spacings within the same heat exchanger. For example, FIG. 7 is a cross-sectional view of the heat exchanger 200 having various stiffeners 306 with different orientations, shapes, and spacings. Each of the divider plates 208a-208d has one or more internal passages 304 (one of which is referenced in FIG. 7) for oil. As illustrated in FIG. 7, two or more of the stiffeners 306 can be skewed at different angles. In some examples, two or more of the stiffeners can have different shapes. For example, as shown in FIG. 7, the stiffeners 306 can be straight or have a curved or wavy contour. Further, two or more of the stiffeners 306 can have different thicknesses. The thickness of a stiffener 306 can be constant, tapered, or have a varying thickness profile. The divider plates 208a-208e can be straight, revolve, or wavey contour. The thickness of a divider plate 208a-208e can be constant, tapered, or have a varying thickness profile. The stiffeners 306 can connect to a divider plate at different node points (offset node arrangement of FIG. 6A) or a single point (common node arrangement of FIG. 6B).

As disclosed above, each air passage i is defined between (1) two of the divider plates 208a-208e and two of the stiffeners 306, or (2) two of the divider plates 208a-208e, one of the stiffeners 306, and one of the plenums 204, 206. In this example, each of the stiffeners 306 is skewed (i.e., non-perpendicular) relative to the divider plate to which it is connected. As a result, each air passage i has a smaller chord length, denoted $L_{1i}$, along one divider plate and a longer chord length, denoted $L_{2i}$, on the opposite divider plate. The chord lengths are measured as a straight line between specific points along the respective divider plates, such as between the points where the stiffeners or plenum that define the air passage i intersect the divider plate. In particular, each of the air passages i has a smaller chord length Lui along one of the divide plates between adjacent stiffeners or one of the stiffeners and one of the plenums, and each of the air passages i has a larger chord length $L_{2i}$ along an adjacent one of the divider plates between the two adjacent stiffeners or the one of the stiffeners and the one of the plenums. For example, as shown in FIG. 7, the $i^{th}$ passage has a smaller chord length $L_{1i}$ along the fourth divider plate 208d between the adjacent stiffeners 306e, 306f that define the $i^{th}$ passage, and the $i^{th}$ passage has a longer chord length $L_{2i}$ along the third divider plate 208c between the adjacent stiffeners 306e, 306f. As another example, the $k^{th}$ passage has a smaller chord length $L_{1k}$ along the third divider plate 208c between the stiffener 306g and the first plenum 204, and the $k^{th}$ passage has a longer chord length $L^{2k}$ along the third divider plate 208b between the stiffener 306g and the first plenum 204.

Designing heat exchangers is generally a very labor intensive and time-consuming process that involves careful consideration of the inter-related thermal, aerodynamic, and mechanical factors that influence heat transfer as well as engine performance (e.g., specific fuel consumption impact). Heat exchangers are assessed for durability, ruggedness, and reliability to be able to perform in harsh environments and over a wide range of environmental conditions. Numerous studies are used to evaluate the combined influences of aero performance, thermal, and mechanical strain on a heat exchanger. These studies test durability by subjecting the heat exchangers to thousands of hours testing. The process is, in large part, experimental given the combined and complex influencing factors that affect heat transfer, aerodynamic flow, and structural rigidity.

The inventors determined during the course of their heat exchanger design that the sizes of the chord lengths of the individual passages have an effect on the durability of the heat exchanger. In particular, the sizes and relationship between the shorter chord length and the longer chord lengths of each of the air passages has an effect on the amount of skewing of the stiffeners 306. As disclosed above, this skewing of the stiffeners 306 enables the stiffeners 306 to not only act as radial heating transfer fins, but also function as structural members that provide strength and rigidity to the heat exchanger. As a result, the heat exchanger may be boxless or frameless (i.e., does not include an outer structural box as seen in known designs), while still meeting the desired thermal heat transfer capabilities for an engine. Not requiring an outer structural box reduces drag and pressure losses, as well as reduces overall weight added to the engine.

As stated above, the inventors created heat exchanger designs with relatively high durability (e.g., a heat exchanger that does not require an outer structural box) for a defined engine environment. FIG. 8A shows a table of seven example heat exchanger designs developed by the inventors. The seven heat exchanger designs are denoted Example 1-Example 7. The table in FIG. 8A includes the shorter chord length L and the longer chord length $L_2$ dimensions for each of the air passages of the corresponding heat exchanger. The air passages are numbered according to the numbering scheme shown in FIG. 4. In particular, in the exemplary embodiment of FIG. 4, the heat exchanger 200 includes four rows. Row 1 corresponds to the bottom row between the fourth and fifth divider plates 208d, 208e, Row 2 corresponds to the row between the third and fourth divider plates 208c, 208d, Row 3 corresponds to the row between the second and third divider plates 208b, 208c, and Row 4 corresponds to the top row between the first and second divider plates 208a, 208b. In the exemplary design, each row has 23 air passages. The air passages of Row 1 are numbered 1-23 from left to right, the air passages of Row 2 are numbered 24-46 from left to right, the air passages of Row 3 are numbered 47-69, and the air passages of Row 4 are numbered 70-92 from left to right. The table in FIG. 8A includes the dimensions (in millimeters) of the shorter chord length $L_1$ and the longer chord length $L_2$ for each of the air passages 1-92. Some of the air passages have a common $L_1$ and $L_2$, which is why certain air passages share a same row in the table.

The inventors found that a heat exchanger design with parameters defined in Examples 2-6 exhibit relatively high structural durability while remaining within engine constraints for an unducted turbine engine having a heat exchanger in a fan duct, such as the gas turbine engine 100 of FIG. 1. In particular, the designs of Examples 2-6 have high structural durability and do not require an outer structural support box. Conversely, Examples 1 and 7 have lower durability (e.g., may require an outer structural support box) for an unducted turbine engine having a heat exchanger in a fan duct, such as the gas turbine engine 100 of FIG. 1.

The examples developed by the inventors shown in FIG. 8A can be characterized by an Expression (1) that can be used to distinguish those designs in Examples 2-6 that meet the performance (durability) requirements from those designs in Examples 1 and 7 that do not meet the performance requirements. In particular, the inventors have determined a unique relationship referred to herein as average skewed stiffener ratio ($\overline{SSR}$), which is defined in Expression (1) as follows:

$$\overline{SSR} = \frac{\sum_{i=1}^{N} L_{2i}}{\sum_{i=1}^{N} L_{1i}}. \quad (1)$$

In Expression (1), i is the air passage number, N is the max or total number of air passages, $L_{1i}$ is the shorter chord length of the $i^{th}$ air passage, and $L_{2i}$ is larger chord length of the $i^{th}$ air passage. Therefore, the average skewed stiffener ratio ($\overline{SSR}$) is a ratio of the sum of the longer chord lengths $L_2$ of all of the air passages i to a sum of the shorter chord lengths $L_1$ of all of the air passages i. The average skewed stiffener ratio ($\overline{SSR}$) generally represents an average amount of skewing of the stiffeners 306.

FIG. 8B shows the same table as FIG. 8A and also includes the average skewed stiffener ratio ($\overline{SSR}$) value as calculated for each of Examples 1-7.

Based on the average skewed stiffener ratio ($\overline{SSR}$) values of Examples 1-7 in FIG. 8B, the inventors determined that a heat exchanger design with an average skewed stiffener ratio ($\overline{SSR}$) of 1.25 to 9 (i.e., 1.25≤$\overline{SSR}$≤9) is advantageous for providing enough structural rigidity to support the heat exchanger without an outer structural frame/box, while still providing sufficient heat transfer capacity and aerodynamic performance. In other words, the range associated with the average skewed stiffener ratio ($\overline{SSR}$) identifies heat exchanger designs that meet the thermal, aerodynamic, and mechanical requirements. Therefore, in some examples disclosed herein, the heat exchanger 200 has an average skewed stiffener ratio ($\overline{SSR}$) in a range of 1.25 to 9 (i.e., 1.25≤$\overline{SSR}$≤9). Heat exchanger designs having an average skewed stiffener ratio ($\overline{SSR}$) outside of this range, such as Examples 1 and 7, do not meet the mechanical requirements. For example, heat exchanger designs having an average skewed stiffener ratio ($\overline{SSR}$) outside of 1.25 to 9 may not provide sufficient structural support or rigidity to operate without a support box or frame.

FIG. 9 shows a table of example heat exchanger designs with different average skewed stiffener ratio ($\overline{SSR}$) values.

A modal analysis was conducted for each example stiffener arrangement for an offset node arrangement and a common node arrangement. For example, the first row represents a heat exchanger configuration having an average skewed stiffener ratio ($\overline{SSR}$) of 1, with offset and common node arrangements, the second row represents a heat exchanger configuration having an average skewed stiffener ratio ($\overline{SSR}$) of 1.5, with offset and common node arrangements, and so forth.

The table in FIG. 9 includes the results of the modal analysis including $1^{st}$ bending modal frequencies for the offset node arrangement and common node arrangement for each example. The $1^{st}$ bending modal frequency is the frequency at which the heat exchanger (including the divider plates and stiffeners) goes into a bending mode shape as a bulk. As shown, the $1^{st}$ bending modal frequency increases with the average skewed stiffener ratio ($\overline{SSR}$). The table in FIG. 9 also includes a frequency ratio, which is the factor of increase of the $1^{st}$ bending modal frequency relative to the average skewed stiffener ratio ($\overline{SSR}$) of 1. As shown, the frequency ratio generally increases largely at the beginning, but then marginally increases with higher and higher average skewed stiffener ratio ($\overline{SSR}$) values. The table in FIG. 9 also includes $1^{st}$ panel modal frequencies for average skewed stiffener ratio ($\overline{SSR}$) values of 5, 6, 8, and 10 of the offset node arrangement. The $1^{st}$ panel modal frequency is the frequency at which the upper and the lower divider plates (e.g., the first and fifth divider plates 208a, 208e) go into their own individual bending mode shape.

Figure 10:
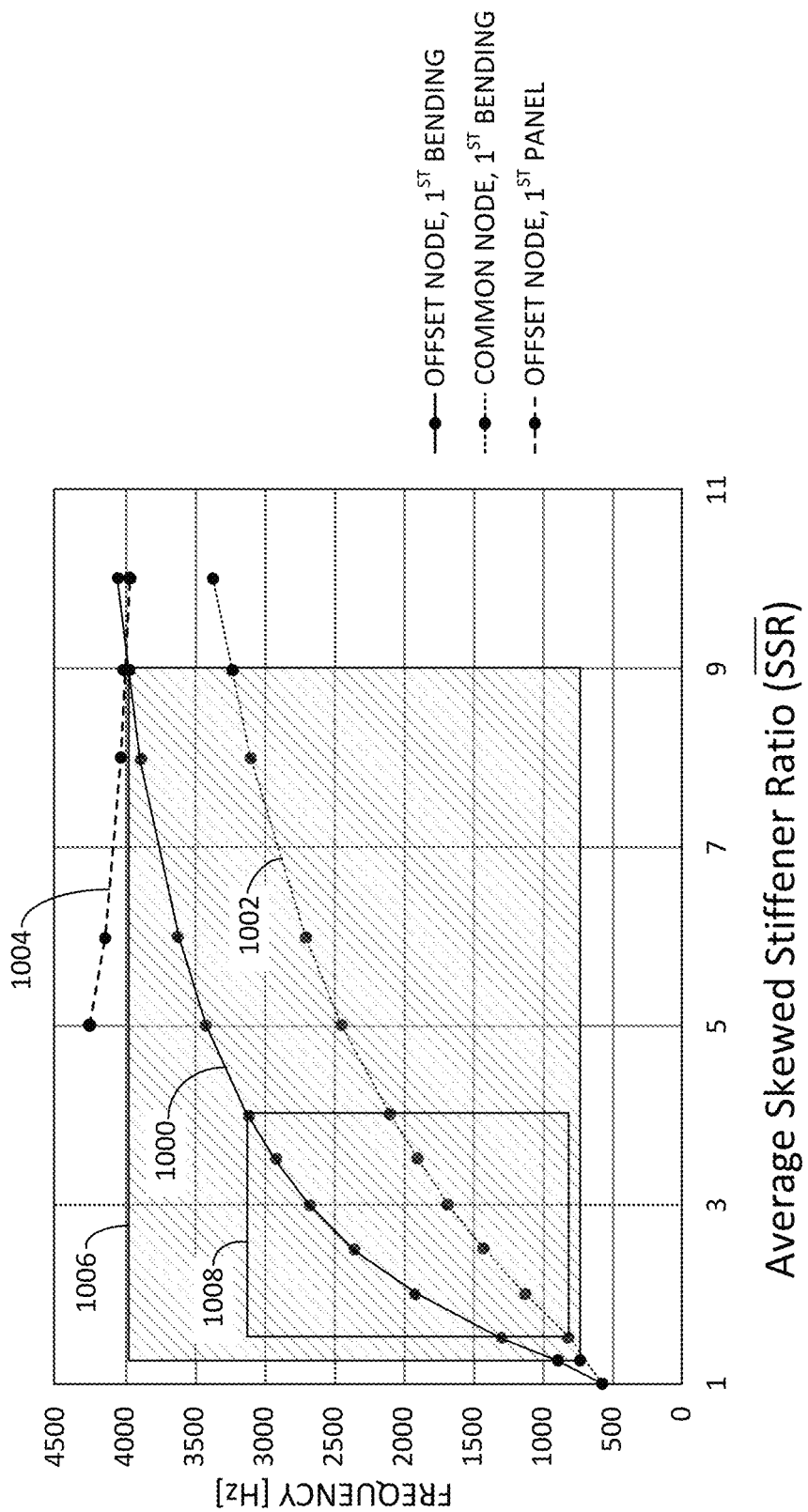
FIG. 10 is a graph of results of a modal frequency analysis on example heat exchanger designs with different average skewed stiffener ratios.

FIG. 10 is a graph of the modal analysis results of the table of FIG. 9, where the average skewed stiffener ratio ($\overline{SSR}$) is on the X-axis and the frequency (in hertz (Hz)) is on the Y-axis. Line 1000 represents the $1^{st}$ bending modal frequencies of the offset node arrangements of the examples in FIG. 9, and line 1002 represents the $1^{st}$ bending modal frequencies of the common node arrangements of the examples in FIG. 9. As shown, the $1^{st}$ bending modal frequency increases with the average skewed stiffener ratio ($\overline{SSR}$). Line 1004 represents the $1^{st}$ panel modal frequencies of the offset node arrangements of average skewed stiffener ratio ($\overline{SSR}$) values of 5, 6, 8, and 10 in FIG. 9. As shown, the $1^{st}$ panel modal frequency decreases with an increasing with the average skewed stiffener ratio ($\overline{SSR}$). At an average skewed stiffener ratio ($\overline{SSR}$) of 9, the $1^{st}$ panel modal frequency crosses the $1^{st}$ bending modal frequency for the offset node arrangement. Therefore, further increasing the average skewed stiffener ratio ($\overline{SSR}$) can lead to a weakening design because of the decreasing panel modal frequency.

FIG. 10 shows a first box 1006 of the design embodiments having an average skewed stiffener ratio ($\overline{SSR}$) in a range of 1.25 to 9. Heat exchanger designs having an average skewed stiffener ratio ($\overline{SSR}$) outside of this range do not meet the thermal, aerodynamic, and/or mechanical requirements. For example, heat exchanger designs having an average skewed stiffener ratio ($\overline{SSR}$) outside of 1.25 to 9 may not provide sufficient structural support or rigidity to operate without a support box or frame.

In some examples, the heat exchanger 200 has an average skewed stiffener ratio ($\overline{SSR}$) of 1.5 to 4 (i.e., 1.5≤$\overline{SSR}$≤4). In particular, the inventors determined this narrower range has better results in terms of mechanical performance. As can be appreciated from FIGS. 9 and 10, the incremental increase in frequency ratio is much larger over the skewed stiffener ratio ($\overline{SSR}$) range of 1.5 to 4 compared to the increase in frequency ratio between 4 and 9. Thus, the net benefit is more drastic over the range of 1.5 to 4. FIG. 10 shows a second box 1008 of the design embodiments having an average skewed stiffener ratio ($\overline{SSR}$) of 1.5 to 4.

In some examples, the inventors determined a heat exchanger having an average skewed stiffener ratio ($\overline{SSR}$) of 3 is advantageous because the stiffener thermal influence zones on the divider plates 208a-208e are equal. However, other average skewed stiffener ratio ($\overline{SSR}$) values perform well thermally and structurally, especially for materials like aluminum that are relatively good thermal conductors.

The average skewed stiffener ratio ($\overline{SSR}$) can be calculated at any cross-section of the heat exchanger 200. For example, the cross-section may be taken at or near the forward end, the middle, or the rear end. Also, the cross-sectional cut can be taken at an angle relative to the divider plates.

A single skewed stiffener ratio ($SSR_i$) can be calculated for each individual air passage i using $L_{2i}/L_{1i}$. In some examples, each air passage i of the respective design may have the same single skewed stiffener ratio ($SSR_i$). However, in other example designs, not all of the air passages i may have the same single skewed stiffener ratio ($SSR_i$). For example, as shown in the table in FIG. 8A, different ones of the air passages have different $L_1$ and $L_2$ values and, as such, may have different single skewed stiffener ratio ($SSR_i$). For example, FIG. 7 shows single skewed stiffer ratio ($SSR_i$) values for various individual air passages i. As shown, different ones of the air passages i can have different single skewed stiffer ratios ($SSR_i$). For example, as labeled in FIG. 7, one of the air passages has a single skewed stiffer ratio $SSR_i=8$, another air passage has a single skewed stiffer ratio $SSR_i=4$, etc. Further, a single skewed stiffer ratio ($SSR_i$) for an air passage i may have a value that falls outside of the limits of 1.25 to 9 (or 1.5 to 4), while the average skewed stiffener ratio ($\overline{SSR}$) may still have a value of 1.25 to 9 (or 1.5 to 4). For example, as labeled in FIG. 7, one of the air passages has a single skewed stiffer ratio $SSR_i=1$. Therefore, it is not necessary that each air passage i have a single skewed stiffener ratio ($SSR_i$) that falls within the limits of 1.25 to 9 (or 1.5 to 4). In other words, a heat exchanger with an average skewed stiffener ratio ($\overline{SSR}$) of 1.25 to 9 (or 1.5 to 4), which meets the desired performance requirements as disclosed above, may have one or more air passages with single skewed stiffer ratio ($SSR_i$) values that are different and/or outside of the above-noted range of 1.25 to 9 (or 1.5 to 4).

Figure 11:
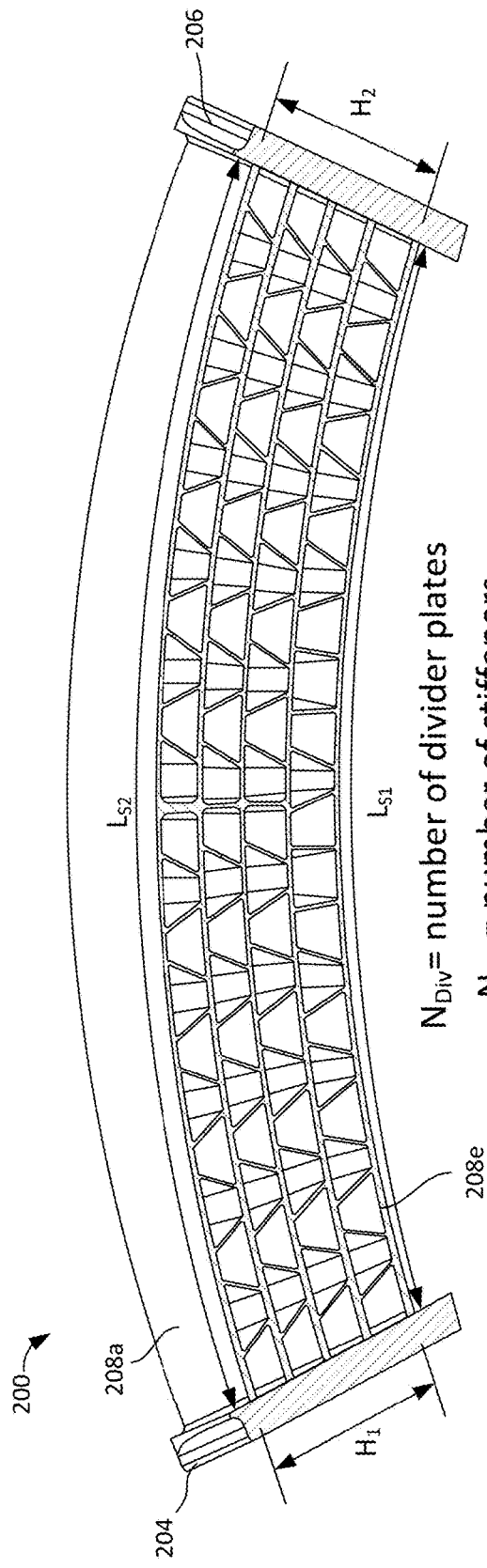
FIG. 11 is the perspective cross-sectional view of the example heat exchanger of FIG. 4 with additional dimensions labeled.

Also disclosed herein is an Air Blockage Ratio that is used to further identify heat exchanger designs that meet the above-noted performance requirements. FIG. 11 is the same perspective cross-sectional view of the heat exchanger 200 of FIG. 4. The divider plates include a top divider plate and a bottom divider plate, which are the upper and lower-most divider plates of the heat exchanger 200. In general, the bottom divider plate is the divider plate that is closest to the axial centerline axis 106, and the top divider plate is the divider plate that is further from the axial centerline axis 106. For instance, in this example, the first divider plate 208a corresponds to the top divider plate and the fifth divider plate 208e corresponds to the bottom divider plate. As shown in FIG. 11, the heat exchanger 200 has a bottom divider plate circumferential length $L_{S1}$, which is defined as the arc length of the bottom divider plate (i.e., the fifth divider plate 208e) between the first and second plenums 204, 206. The heat exchanger 200 also has a top divider plate circumferential length $L_{S2}$, which is defined as the arc length of the top divider plate (i.e., the first divider plate 208a) between the first and second plenums 204, 206. The more the heat exchanger 200 is curved or arc shaped, the larger the difference between $L_{S1}$ and $L_{S2}$. In some examples, the bottom divider plate circumferential length $L_{S1}$ and the top divider plate circumferential length $L_{S2}$ are the same, but in other examples can be different. The heat exchanger 200 has a maximum height $H_1$, which is defined as the maximum distance between the top and bottom divider plates (i.e., between the first and fifth divider plates 208a, 208e), and a minimum height $H_2$, which is defined as the minimum distance between the top and bottom divider plates (i.e., the first and fifth divider plates 208a, 208e). In some examples, such as shown in FIG. 11, the distance between the upper and lower divider plates 208a, 208e may be constant, such that $H_1$ and $H_2$ are the same. However, in other examples, the distance between the upper and lower divider plates 208a, 208e may change along the arc length, such that $H_1$ and $H_2$ are the different. $N_{Div}$ is defined as the number of divider plates. For example, in the heat exchanger 200 of FIG. 11, $N_{Div}$ is 5. However, in other examples, the heat exchanger 200 can include more or fewer divider plates. $N_{Stf}$ is defined as the number of stiffeners between two dividers. For example, in the heat exchanger 200 of FIG. 11, $N_{Stf}$ is 22. In other words, there are 22 stiffeners between each adjacent pair of the divider plates 208a-208e. However, in other examples, the heat exchanger 200 can include more or fewer stiffeners in each row. $\overline{T_{Div}}$ is defined as the average width or thickness of the divider plates 208a-208e. For example, FIG. 5 shows an example thickness $T_{Div}$ of the first divider plate 208a. $\overline{T_{Stf}}$ is defined as the average width or thickness of the stiffeners 306. For example, FIG. 5 shows an example thickness $T_{Stf}$ of the second stiffener 306b.

Figure 12:
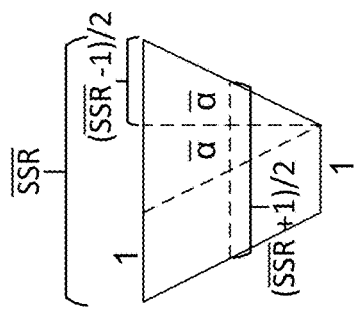
FIG. 12 illustrates a schematic for determining an average skewed stiffener angle.

As disclosed above, an average skewed stiffener ratio ($\overline{SSR}$) can be calculated for the heat exchanger 200 based the smaller and longer chord lengths of the air passages. Once an average skewed stiffener ratio ($\overline{SSR}$) is known, an average stiffener skew angle $\overline{\alpha}$ can be calculated using the example schematic in FIG. 12, discussed in further detail herein.

FIGS. 13A, 13B, and 13C are tables of example heat exchanger designs determined by the inventors to meet the aerodynamic, thermal, and mechanical performance requirements. For each example (denoted Ex.), the Tables include the bottom divider plate circumferential length $L_{S1}$ (in millimeters (mm)), the top divider plate circumferential length $L_{S2}$ (in millimeters (mm)), the maximum height $H_1$ (in millimeters (mm)), the minimum height $H_2$ (in millimeters (mm)), the average thickness of the dividers $\overline{T_{Div}}$ (in millimeters (mm)), the average thickness of the stiffeners $\overline{T_{Stf}}$ (in millimeters (mm)), the number of divider plates $N_{Div}$, the number of stiffeners $N_{Stf}$ between adjacent divider plates, and the average skewed stiffener ratio ($\overline{SSR}$). FIGS. 13A, 13B, and 13C represent examples taken at different cross-sections of a heat exchanger, such as the heat exchanger 200. In particular, FIG. 13A represents examples taken at a cross-section at the forward end of a heat exchanger, FIG. 13B represents examples taken at a cross-section midway between the forward and aft ends, and FIG. 13C represents examples taken at a cross-section at the aft end of the heat exchanger.

Based on the design space of embodiments they created, a unique relationship was determined by the inventors, referred to herein as an Air Blockage Ratio, which is defined in Expression (2) as follows:

$$\text{Air Blockage Ratio} = \frac{\text{Area}_{Div} + \text{Area}_{Stf}}{\text{Area}_{Air}}. \qquad (2)$$

In Expression (2), $\text{Area}_{Div}$ represents the area consumed by the divider plates 208a-208e, i.e., the 2D area taken up by the divider plates 208a-208e in the cross-sectional view. $\text{Area}_{Stf}$ represents the area consumed by the stiffeners 306. $\text{Area}_{Air}$ represents the total area of flow path consumed by the heat exchanger 200 (between the divider plates top to bottom and end to end). Therefore, the Air Blockage Ratio generally represents the ratio of the area of solid structure (including the divider plates and the stiffeners) to the total area of the heat exchanger 200 along a certain cross-sectional cut. The area values for $\text{Area}_{Div}$, $\text{Area}_{Stf}$, and $\text{Area}_{Air}$ can be measured from component cut-up surfaces. The cut-up refers to a cross-section formed by physically cutting (e.g., via a saw) a heat exchanger or virtually modeling (e.g., via a computer-aided design (CAD) model or computed tomography (CT) scan) a cross-section of a heat exchanger. The cut-up can be taken at any cross-sectional plane through the heat exchanger. The Air Blockage Ratio is affected by the various lengths, thickness, angles, etc. of the divider plates and the stiffeners of the heat exchanger 200. A higher Air Blockage Ratio indicates a higher area of solid structure and therefore less air passage area. Conversely, a lower Air Blockage Ratio represents a smaller area of solid structure and therefore more air passage area. Further, the higher number of stiffeners, the larger the air blockage.

The Air Blockage Ratio can also be calculated using the following Expressions (3)-(7) if the number of stiffeners between each pair of divider plates is the same.

$\text{Area}_{Div}$ is defined in Expression (3) as follows:

$$\text{Area}_{Div} = \frac{L_{S1} + L_{S2}}{2} \cdot \overline{T_{Div}} \cdot N_{Div}. \quad (3)$$

In Expression (3), $L_{S1}$ is the bottom divider plate circumferential length, $L_{S2}$ is the top divider plate circumferential length, $\overline{T_{Div}}$ is the average thickness of divider plates, and $N_{Div}$ is the number of divider plates.

$\text{Area}_{Stf}$ is defined in Expression (4) as follows:

$$\text{Area}_{Stf} = \left(\frac{H_1 + H_2}{2} - \overline{T_{Div}} \cdot N_{Div}\right) \cdot \frac{1}{\cos\overline{\alpha}} \cdot \overline{T_{Stf}} \cdot N_{Stf}. \quad (4)$$

In Expression (4), $H_1$ is the maximum distance or height between the top and bottom divider plates (i.e., the first and fifth divider plates 208a, 208e), $H_2$ is the minimum height between the top and bottom divider plates, $\overline{T_{Stf}}$ is the average thickness of the stiffeners, and $N_{Stf}$ is the number of stiffeners between two divider plates. $\overline{\alpha}$ is the average skewed stiffener angle. $1/\cos\overline{\alpha}$ is defined in Expressions (5) and (6) and using the schematic in FIG. 12 as follows:

$$\tan\overline{\alpha} = \frac{\frac{L_{S1} + L_{S2}}{2 \cdot (N_{Stf} + 1)} \cdot \frac{\overline{SSR} - 1}{\overline{SSR} + 1}}{\frac{H_1 + H_2}{2 \cdot (N_{Div}^{-1})}}. \quad (5)$$

$$\frac{1}{\cos\overline{\alpha}} = \sqrt{1 + \tan^2\overline{\alpha}}. \quad (6)$$

The total area ($\text{Area}_{Air}$) is defined in Expression (7) as follows:

$$\text{Area}_{Air} = \frac{L_{S1} + L_{S2}}{2} \cdot \frac{H_1 + H_2}{2}. \quad (7)$$

Using Expression (3)-(7) above, the Air Blockage Ratio of Expression (2) can be calculated.

FIGS. 14A, 14B, 14C include the same example Tables of FIGS. 13A, 13B, and 13C, respectively, and also include values for $\tan(\overline{\alpha})$, $1/\cos(\overline{\alpha})$, $\text{Area}_{Div}$ (in millimeters squared), $\text{Area}_{Stf}$ (in millimeters squared), $\text{Area}_{Air}$ (in millimeters squared), and Air Blockage Ratio for each example. In general, the inventor determined that the average skewed stiffener ratio ($\overline{SSR}$) has a relatively small effect on the Air Blockage Ratio, the number of stiffeners $N_{Stf}$ has a moderate impact on the Air Blockage Ratio, and the divider thickness $T_{Div}$ and the number of dividers $N_{Div}$ has the largest impact on the Air Blockage Ratio.

Based on the example designs of FIGS. 14A, 14B, 14C, the inventors determined that a heat exchanger design with an Air Blockage Ratio of 0.10 to 0.29 is advantageous for providing enough structural rigidity to support the heat exchanger without an outer support frame/box, while still providing sufficient heat transfer capacity and aero performance. Therefore, in some examples disclosed herein, the heat exchanger 200 has Air Blockage Ratio of 0.10 to 0.29 (i.e., 0.10≤ Air Blockage Ratio≤0.29). Heat exchanger designs having an Air Blockage Ratio outside of this range do not meet the thermal, aerodynamic, and/or mechanical requirements. For example, heat exchanger designs having an Air Blockage Ratio outside of the range of 0.10 to 0.29 do not provide sufficient structural support or rigidity to operate without a support box or frame, do not provide sufficient heat capacity, and/or do not meet aerodynamic performance requirements for the engine. In some instances, it was found that heat exchangers having an Air Blockage Ratio of greater than 0.29 have an air side pressure drop, and heat exchanger designs having an Air Blockage Ratio of less than 0.10 are not mechanically rigid or stiff enough to be supported on their own.

In some examples, an example heat exchanger disclosed herein may satisfy the average skewed stiffener ratio ($\overline{SSR}$) range but not the Air Blockage Ratio range while still providing the enumerated benefits discussed herein. In some examples, the Air Blockage Ratio range is used to help further identify advantageous heat exchanger designs. Thus, in some examples, an example heat exchanger disclosed herein can satisfy both the average skewed stiffener ratio ($\overline{SSR}$) range and the Air Blockage Ratio range disclosed herein and provide the enumerated benefits discussed herein.

In some examples, the heat exchanger 200 can include cantilevered fins.

Figure 15:
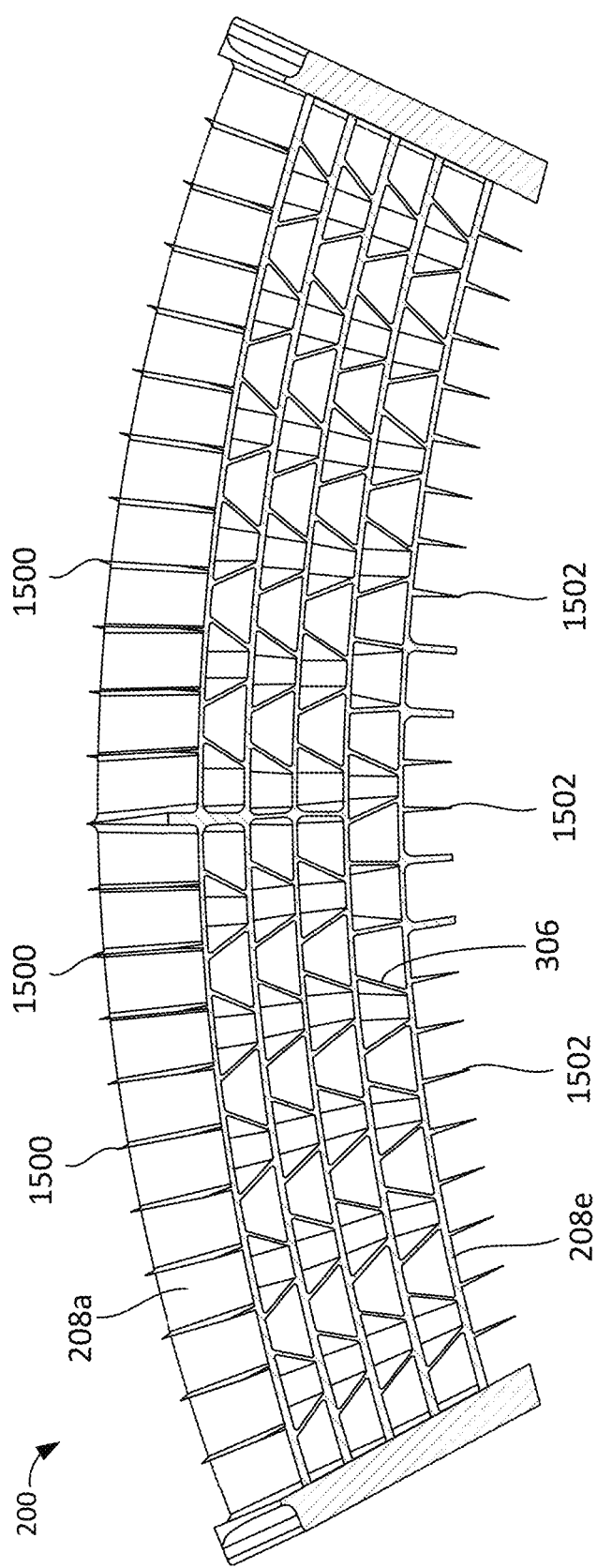
FIG. 15 illustrates an example heat exchanger with radial fins.

For example, FIG. 15 shows an example of the heat exchanger 200 having a first set of fins 1500 (three of which are referenced in FIG. 4). The first set of fins 1500 are cantilevered from top of the first divider plate 208a. Similarly, the heat exchanger 200 has a second set of fins 1502 (there of which are reference din FIG. 4) that are cantilevered from the bottom of the fifth divider plate 208e. The heat exchanger 200 can include any number of fins 1500, 1502 and the fins can extend any various angles, have various shapes, and/or various spacings. The fins 1500, 1502 increase the surface area of the heat exchanger 200 and therefore increase heat transfer between the air and the oil. However, because the fins 1500, 1502 are cantilevered, the fins 1500, 1502 do not provide structural support/rigidity as the stiffeners.

Any of the example heat exchangers disclosed herein can be implemented in the gas turbine engine 100 of FIG. 1. In some examples, multiple ones of the heat exchangers can be implemented in the gas turbine engine 100. In some examples, two or more of the heat exchangers have different stiffener arrangements.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

The example heat exchanger disclosed herein include skewed or angled stiffeners between the divider plates that not only act as radial fins to increase surface area (and therefore heat transfer) but also add structural rigidity and stiffness to the heat exchanger. This skewing or angling enables the stiffeners to act as structural braces that distribute loads and therefore strengthens the heat exchanger design. As such, the example heat exchanger designs disclosed herein do not require the use of an outer structural box/frame. This results in reduce weight and flow obstruction and, thus, increased engine performance efficiency.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A heat exchanger for a gas turbine engine, the heat exchanger comprising: a first plenum; a second plenum; divider plates coupled to and extending between the first and second plenums, the divider plates spaced apart from each other, each of the divider plates having one or more internal passages for a fluid to flow between the first and second plenums; and stiffeners between each adjacent pair of the divider plates, wherein at least one of the stiffeners is skewed relative to a connecting one of the divider plates, wherein the heat exchanger has a number N of air passages i, wherein each air passage i is formed between (1) two of the divider plates and two of the stiffeners or (2) two of the divider plates, one of the stiffeners, and one of the plenums, wherein each of the air passages i has a smaller chord length $L_{1i}$ along one of the divider plates between two adjacent stiffeners or one of the stiffeners and one of the plenums, and wherein each of the air passages i has a larger chord length $L_{2i}$ along an adjacent one of the divider plates between the two adjacent stiffeners or the one of the stiffeners and the one of the plenums, and wherein, $$1.25 \leq \frac{\sum_{i=1}^{N} L_{2i}}{\sum_{i=1}^{N} L_{1i}} \leq 9.$$

The heat exchanger of any preceding clause, wherein $$1.5 \leq \frac{\sum_{i=1}^{N} L_{2i}}{\sum_{i=1}^{N} L_{1i}} \leq 4$$

The heat exchanger of any preceding clause, wherein each of the air passages i has a single skewed stiffener ratio ($SSR_i$) defined as $L_{2i}/L_{1i}$.

The heat exchanger of any preceding clause, wherein two or more of the air passages i have different single skewed stiffener ratios ($SSR_i$).

The heat exchanger of any preceding clause, wherein one or more of the air passages has a single skewed stiffener ratio ($SSR_i$) that is outside of the range of 1.25 to 9.

The heat exchanger of any preceding clause, wherein the stiffeners are arranged in repeating pairs of stiffeners, and each pair of the stiffeners includes two stiffeners skewed in opposite directions.

The heat exchanger of any preceding clause, wherein the stiffeners are arranged in an offset node arrangement.

The heat exchanger of any preceding clause, wherein the stiffeners are arranged in a common node arrangement.

The heat exchanger of any preceding clause, wherein two or more of the stiffeners are skewed at different angles.

The heat exchanger of any preceding clause, wherein two or more of the stiffeners have different thicknesses.

The heat exchanger of any preceding clause, wherein two or more of the stiffeners have different shapes.

The heat exchanger of any preceding clause, wherein the heat exchanger has an area ($Area_{Div}$) consumed by the divider plates, wherein the heat exchanger has an area ($Area_{Stf}$) consumed by the stiffeners, wherein the heat exchanger has a total area ($Area_{Air}$) consumed by the heat exchanger, wherein, $$0.10 \leq \frac{Area_{Div} + Area_{Stf}}{Area_{Air}} \leq 0.29.$$

The heat exchanger of any preceding clause, wherein a number of stiffeners between each adjacent pair of the divider plates is the same, wherein the divider plates include a top divider plate and a bottom divider plate, wherein the heat exchanger has a bottom divider plate circumferential length ($L_{S1}$) defined as an arc length of the bottom divider plate between the first and second plenums, a top divider plate circumferential length ($L_{S2}$) defined as the arc length of the top divider plate between the first and second plenums, a maximum height ($H_1$) defined as a maximum distance between the top and bottom divider plates, and a minimum height ($H_2$) defined as a minimum distance between the top and bottom divider plates, wherein the area ($Area_{Div}$) consumed by the divider plates is defined as follows:

$$Area_{Div} = \frac{L_{S1} + L_{S2}}{2} \cdot \overline{T_{Dv}} \cdot N_{Div},$$

wherein $\overline{T_{Div}}$ is an average thickness of the divider plates, and $N_{Div}$ is a number of divider plates, wherein the area (Areas) consumed by the stiffeners is defined as follows:

$$Area_{Stf} = \left(\frac{H_1 + H_2}{2} - \overline{T_{Dv}} \cdot N_{Div}\right) \cdot \frac{1}{\cos \overline{\alpha}} \cdot \overline{T_{Stf}} \cdot N_{Stf},$$

wherein $\overline{T_{Stf}}$ is an average thickness of the stiffeners, $N_{Stf}$ is a number of stiffeners between two divider plates, and a is an average stiffener skew angle defined as follows:

$$\tan \overline{\alpha} = \frac{\frac{L_{S1}+L_{S2}}{2\cdot(N_{Stf}+1)} \cdot \frac{\overline{SSR}-1}{\overline{SSR}+1}}{\frac{H_1+H_2}{2\cdot(N_{Div}-1)}},$$

$$\frac{1}{\cos \overline{\alpha}} = \sqrt{1+\tan^2 \overline{\alpha}}, \text{ and}$$

wherein the total area (Area$_{Air}$) consumed by the heat exchanger is defined as follows:

$$\text{Area}_{Air} = \frac{L_{S1}+L_{S2}}{2} \cdot \frac{H_1+H_2}{2}.$$

The heat exchanger of any preceding clause, wherein the maximum height ($H_1$) and the minimum height ($H_2$) are the same.

The heat exchanger of any preceding clause, wherein the bottom divider plate circumferential length ($L_{S1}$) and the top divider plate circumferential length ($L_{S2}$) are the same.

The heat exchanger of any preceding clause, wherein the divider plates include a top divider plate and a bottom divider plate, and wherein the heat exchanger has a first set of fins cantilevered from the top divider plate.

The heat exchanger of any preceding clause, wherein the heat exchanger has a second set of fins cantilevered from the bottom divider plate.

The heat exchanger of any preceding clause, wherein each of the divider plates is curved between the first and second plenums.

The heat exchanger of any preceding clause, wherein the heat exchanger is frameless.

A gas turbine engine comprising the heat exchanger of any preceding clause.

What is claimed is:

1. A heat exchanger for a gas turbine engine, the heat exchanger comprising:
   a first plenum;
   a second plenum;
   divider plates coupled to and extending between the first and second plenums, the divider plates spaced apart from each other, each of the divider plates having one or more internal passages for a fluid to flow between the first and second plenums; and
   stiffeners between each adjacent pair of the divider plates, wherein at least one of the stiffeners is skewed relative to a connecting one of the divider plates,
   wherein the heat exchanger has a number N of air passages i,
   wherein each air passage i is formed between (1) two of the divider plates and two of the stiffeners or (2) two of the divider plates, one of the stiffeners, and one of the plenums,
   wherein each of the air passages i has a smaller chord length $L_{1i}$ along one of the divider plates between two adjacent stiffeners or one of the stiffeners and one of the plenums, and wherein each of the air passages i has a larger chord length $L_{2i}$ along an adjacent one of the divider plates between the two adjacent stiffeners or the one of the stiffeners and the one of the plenums, and wherein, $$1.25 \le \frac{\sum_{i=1}^{N} L_{2i}}{\sum_{i=1}^{N} L_{1i}} \le 9.$$

2. The heat exchanger of claim 1, wherein $$1.5 \le \frac{\sum_{i=1}^{N} L_{2i}}{\sum_{i=1}^{N} L_{1i}} \le 4.$$

3. The heat exchanger of claim 1, wherein each of the air passages i has a single skewed stiffener ratio (SSR$_i$) defined as $L_{2i}/L_{1i}$.

4. The heat exchanger of claim 3, wherein two or more of the air passages i have different single skewed stiffener ratios (SSR$_i$).

5. The heat exchanger of claim 3, wherein one or more of the air passages has a single skewed stiffener ratio (SSR$_i$) that is outside of the range of 1.25 to 9.

6. The heat exchanger of claim 1, wherein the stiffeners are arranged in repeating pairs of stiffeners, and each pair of the stiffeners includes two stiffeners skewed in opposite directions.

7. The heat exchanger of claim 1, wherein the stiffeners are arranged in an offset node arrangement.

8. The heat exchanger of claim 1, wherein the stiffeners are arranged in a common node arrangement.

9. The heat exchanger of claim 1, wherein two or more of the stiffeners are skewed at different angles.

10. The heat exchanger of claim 1, wherein two or more of the stiffeners have different thicknesses.

11. The heat exchanger of claim 1, wherein two or more of the stiffeners have different shapes.

12. The heat exchanger of claim 1, wherein the heat exchanger has an area (AreaDiv) consumed by the divider plates, wherein the heat exchanger has an area (AreaStf) consumed by the stiffeners, wherein the heat exchanger has a total area (AreaAir) consumed by the heat exchanger, wherein, $$0.10 \le \frac{\text{Area}_{Div}+\text{Area}_{Stf}}{\text{Area}_{Air}} \le 0.29.$$

13. The heat exchanger of claim 12, wherein a number of stiffeners between each adjacent pair of the divider plates is the same, wherein the divider plates include a top divider plate and a bottom divider plate, wherein the heat exchanger has a bottom divider plate circumferential length ($L_{S1}$) defined as an arc length of the bottom divider plate between the first and second plenums, a top divider plate circumferential length ($L_{S2}$) defined as the arc length of the top divider plate between the first and second plenums, a maximum height ($H_1$) defined as a maximum distance between the top and bottom divider plates, and a minimum height ($H_2$) defined as a minimum distance between the top and bottom divider plates, wherein the area (Area$_{Div}$) consumed by the divider plates is defined as follows:

$$\text{Area}_{Div} = \frac{L_{S1}+L_{S2}}{2} \cdot \overline{T_{Div}} \cdot N_{Div},$$

wherein $\overline{T_{Div}}$ is an average thickness of the divider plates, and $N_{Div}$ is a number of divider plates,
wherein the area ($Area_{Stf}$) consumed by the stiffeners is defined as follows:

$$Area_{Stf} = \left(\frac{H_1 + H_2}{2} - \overline{T_{Div}} \cdot N_{Div}\right) \cdot \frac{1}{\cos \overline{\alpha}} \cdot \overline{T_{Stf}} \cdot N_{Stf},$$

wherein $\overline{T_{Stf}}$ is an average thickness of the stiffeners, $N_{Stf}$ is a number of stiffeners between two divider plates, and $\overline{\alpha}$ is an average stiffener skew angle defined as follows:

$$\tan \overline{\alpha} = \frac{\frac{L_{S1} + L_{S2}}{2 \cdot (N_{Stf} + 1)} \cdot \frac{\overline{SSR} - 1}{\overline{SSR} + 1}}{\frac{H_1 + H_2}{2 \cdot (N_{Div} - 1)}},$$

$$\frac{1}{\cos \overline{\alpha}} = \sqrt{1 + \tan^2 \overline{\alpha}}, \text{ and}$$

wherein the total area ($Area_{Air}$) consumed by the heat exchanger is defined as follows:

$$Area_{Air} = \frac{L_{S1} + L_{S2}}{2} \cdot \frac{H_1 + H_2}{2}.$$

14. The heat exchanger of claim 13, wherein the maximum height ($H_1$) and the minimum height ($H_2$) are the same.

15. The heat exchanger of claim 13, wherein the bottom divider plate circumferential length ($L_{S1}$) and the top divider plate circumferential length ($L_{S2}$) are the same.

16. The heat exchanger of claim 1, wherein the divider plates include a top divider plate and a bottom divider plate, and wherein the heat exchanger has a first set of fins cantilevered from the top divider plate.

17. The heat exchanger of claim 16, wherein the heat exchanger has a second set of fins cantilevered from the bottom divider plate.

18. The heat exchanger of claim 1, wherein each of the divider plates is curved between the first and second plenums.

19. The heat exchanger of claim 1, wherein the heat exchanger is frameless.

20. A gas turbine engine comprising the heat exchanger of claim 1.

* * * * *